(12) United States Patent
Fetzer

(10) Patent No.: US 6,367,843 B1
(45) Date of Patent: Apr. 9, 2002

(54) REMOTE OPERABLE FASTENER AND METHOD OF USE

(75) Inventor: Kelly Fetzer, Houston, TX (US)

(73) Assignee: Automated Connectors Holdings, L.B., Houston, TX (US)

( * ) Notice: Subject to any disclaimer, the term of this patent is extended or adjusted under 35 U.S.C. 154(b) by 0 days.

(21) Appl. No.: 09/291,435

(22) Filed: Apr. 13, 1999

Related U.S. Application Data

(63) Continuation-in-part of application No. 08/790,847, filed on Feb. 3, 1997, now Pat. No. 5,908,210.

(51) Int. Cl.[7] .................... F16L 23/04; F16L 23/08
(52) U.S. Cl. .............. 285/24; 285/920; 285/420; 285/81; 285/411
(58) Field of Search .............. 285/411, 81, 920, 285/409, 420; 292/256.69

(56) References Cited

U.S. PATENT DOCUMENTS

| | | | |
|---|---|---|---|
| 2,673,102 A | * 3/1954 | Hutchinson | 285/409 |
| 2,717,788 A | * 9/1955 | Raynes | 285/411 |
| 2,878,041 A | * 3/1959 | Hobbs | 285/411 |
| 2,956,818 A | * 10/1960 | Dickerson et al. | 285/920 |
| 3,231,297 A | * 1/1966 | Watts et al. | 285/411 |
| 3,403,931 A | * 10/1968 | Crain et al. | 285/411 |
| 4,191,410 A | * 3/1980 | Voituriez | 285/411 |
| 4,347,944 A | 9/1982 | Moldrup | 220/320 |
| 4,441,741 A | * 4/1984 | Galle, Jr. | 285/920 |
| 4,441,742 A | * 4/1984 | Owens, III | 285/920 |
| 4,722,557 A | 2/1988 | Bormioli | 285/18 |
| 4,726,109 A | 2/1988 | Malsbury et al. | 29/402.08 |
| 4,730,850 A | 3/1988 | Takahashi | 285/3 |
| 4,820,384 A | 4/1989 | Pechacek | 202/245 |
| 5,048,876 A | 9/1991 | Wallskog | 285/364 |
| 5,221,019 A | 6/1993 | Pechacek et al. | 220/315 |
| 5,228,825 A | 7/1993 | Fruchtbaum et al. | 414/684.3 |
| 5,259,930 A | 11/1993 | Barker et al. | 201/2 |
| 5,294,157 A | 3/1994 | Smith et al. | 292/25 |
| 5,336,375 A | 8/1994 | Wallskog et al. | 202/96 |
| 5,500,094 A | 3/1996 | Fruchtbaum et al. | 202/241 |
| 5,570,911 A | 11/1996 | Galle | 285/364 |
| 5,581,864 A | 12/1996 | Rabet | 29/426.3 |
| 5,707,089 A | 1/1998 | Fend | 285/411 |

FOREIGN PATENT DOCUMENTS

| | | | | |
|---|---|---|---|---|
| DE | 2355779 A1 | | 5/1975 | |
| DE | 2500896 | * | 7/1976 | 285/920 |
| EP | 0155757 A2 | | 9/1985 | |
| EP | 0330295 A1 | | 8/1989 | |
| GB | 305609 | * | 2/1929 | 285/411 |
| GB | 555912 | | 9/1943 | |
| SU | 756917 | * | 10/1984 | 285/411 |
| WO | WO 91/06800 | | 5/1991 | |
| WO | WO 93/19311 | | 9/1993 | |

OTHER PUBLICATIONS

Anthony J. Nagy and Leslie P. Antalffy, Head–operating mechanism improves delayed coker safety, efficiency; *Oil and Gas Journal*, May 29, 1989, pp. 77–80.

Hahn & Clay Fact System; Swing–Away Design, (brochure) 1991.

* cited by examiner

*Primary Examiner*—Eric K. Nicholson
(74) *Attorney, Agent, or Firm*—Locke Liddell & Sapp LLP

(57) ABSTRACT

At least one fastener and its method of use to securely fasten joints, preferably in pressure vessels, pipes, and other structures, intended to isolate internal volumes from the external environment, or in structural joints. The fastener preferably comprises at least one force reacting or force producing element capable of maintaining a gap between the end of at least one clamp segment of a clamp connector used on flanged structures to isolate a structure's internal environment from its external environment to provide controlled contact with the flange members wherein uniform seal integrity is secured and contact surface wear is dispelled. In a preferred method of use, each fastener is used in conjunction with delayed cokers, wherein extremely high temperature and relatively low pressures are generated.

20 Claims, 22 Drawing Sheets

REMOTE OPERABLE FASTENER AND METHOD OF USE

This is a continuation in part of U.S. patent application Ser. No. 08/790,847 filed Feb. 3, 1997 now U.S. Pat. No. 5,908,210.

FIELD OF INVENTION

This invention relates to a fastener to securely fasten joints, preferably in pressure vessels, pipes, and other structures, intended to isolate internal volumes from the external environment, or in structural joints. The invention may be used to secure a pressure seal in vessel applications, join structural units or tubular members having internal passages. The invention may be used in any application currently utilizing standard bolted flanges or to aid in sealing vessels, pipes, or other structural joints.

In an embodiment of the invention, the fastener is used in a clamp-type connector that can join flange members together in an abutting engagement, creating a pressure seal in order to isolate the joint's internal environment from its external environment. This embodiment is unique in its controlled contact with the flange members wherein uniform seal integrity is secured and contact surface wear is dispelled.

An embodiment of the invention is especially useful in Delayed Cokers, wherein extremely high temperature and relatively low pressures are generated. It effectively handles the deleterious effects of coke exposure or other "dirty" operations. This embodiment is especially useful in quickly and simply retrofitting existing Delayed Cokers. It can be adapted to the existing flange member disposed on Delayed Cokers without having to use a spool-piece adapter.

An embodiment of the invention is also especially adapted to quickly flange up and safely secure extreme pressure vessels while supplying uniform seal integrity under extreme pressure and to quickly open such secured vessels. Therefore, the invention is advantageous in making high-pressure batch-type operations highly efficient and cost effective. A typical application is high-pressure food processing wherein, under extremely high-pressure, pathogens rupture, leaving food less perishable.

BACKGROUND OF THE INVENTION

The limitations of the prior art compromised safety to provide quick acting joint connecting devices. The prior art discloses single point failure mechanisms, wherein the failure of only one fastener element can catastrophically rend the joint. There is a need in industry to be able to remote open and close a joint with advantages of a safely articulated fastening mechanism and to do so while providing uniform seal integrity. The prior art is laden with quick acting joint connecting devices that fail to provide significant safety. Failure of these mechanisms prompted the American Society of Mechanical Engineers (ASME) to develop rules in their Boiler and Pressure Vessel Codes that give specific rules for adding safety to "Quick Acting" devices. Single acting fastening mechanisms and single point failure devices need secondary back-up retaining elements that assure joint integrity upon failure of the single acting fastening means or single point failure devices. Such retaining elements complicate automated operation, however.

In some installations, pressure vessels, pipes, and structural joints are opened and closed manually under conditions that are hazardous to the people performing the operation. Most prior installations utilize joint connectors comprised of bolted flanges that demand significant manual activity. The basic closing nature of bolted flanges is illustrated in the American Society of Mechanical Engineers' (ASME) Publication B16.5. Other manually operated prior art for connecting joints comprise threaded, clamped, and breach-lock mechanisms. These labor-intensive designs are not well suited in hazardous environments, however.

Most coke drums have manually-bolted joint connectors to join vessel closures and other structural units to the coke drum, thus closing and sealing the internal environment of coke drum. Coke drums may also have manually bolted connections connecting upstream and downstream pipes to the coke drum. Historically, manually operating these connections to dispose them open or closed has proven to be harmful to workmen and inefficient to production.

Although the prior art provides attempts at simplicity, it does not provide sufficient safety. In analyzing paths of failure, the prior art contains unsafe, single component failure paths that cause the catastrophic opening of the connected joint upon failure. A need exists to create a safe connection by incorporating safe articulation in the fasteners and eliminate all single point failure locations in a connector's articulation.

The inclusion of safe articulation in a remote operable connector entails additional expense and difficulty. Those skilled in the art can appreciate the benefit of a simple, remote operable fastener that can provide safely articulated connections. The system should be manually operable as well as provide for alternative operation in the event of an interruption of the remote operation. In short, when compared to other remote operable connectors, a need exists for a simpler connection.

This simplicity directly relates to lower operating and maintenance costs and shortened down time for maintenance. In some processes, one day of down time can result in an economic loss far surpassing the initial cost of the remote operable connector. Simplicity in design is highly valued by end users of this technology. The prior art discloses remote operable joint connectors providing multiple fasteners by incorporating overly complex mechanisms. In the process of providing multiple fasteners, the prior art sacrifices simplicity, reliability, and economy.

U.S. Pat. Nos. 5,336,375; 4,820,384; 5,221,019; 5,294,157; 5,228,825; 5,048,876, 5,471,739 and 4,726,76 are clamp-type mechanisms designed to remote assist or perform connecting and disconnecting of joints in pressure vessels. Those skilled in the art recognize that these devices have many limitations and are inherently unreliable, and expensive to manufacture.

Pressure and temperature of the working fluid, mechanical loads, and mechanical properties of the sealing gaskets dictate the magnitude of the gasket crushing clamping force. Gaskets that are suitable for moderate to high temperatures and pressures are not generally self-energized elastomers. A self-energized gasket will attempt to provide its own sealing force such as a rubber or asbestos gasket. Of course such gaskets cannot provide sufficient sealing force in many applications. Self-energized or low seating stress gaskets are generally used with connectors that produce no gasket crushing force or have some limitation or weakness in providing sufficient force to seat crush-type gaskets that are appropriate in high temperature service and many other application. Self-energized gaskets are also used when a connector is unable to provide substantial uniform seal integrity.

Prior clamp-type connectors have significant weakness in such areas. In a clamp-type connector, clamp segments deflect under load of fasteners. If such deflection is not accounted for, seal integrity is questionable because such prior clamp segments apply more clamping force near the fasteners and are therefore susceptible to leaks away from the fasteners. If this deflection is not accounted for, clamp segments and mating flange members are susceptible to contact interface damage in cyclic service. Therefore, a need exists in the industry for a safely articulated fastener incorporated into a remote operable clamp-type connector that effectively seals a joint even if a high seating stress, crush-type gasket is warranted or beneficial.

The mechanism disclosed in U.S. Pat. No. 4,483,458 ("the '458 patent") cannot supply axial joint closing force because this device allows the clamp halves, the closing elements, and the pressure vessel housing to move axially relative to one another. Another result stemming from this relative movement is fatigue damage. The '458 patent device will encounter unacceptable fatigue damage in cyclic operation, requiring frequent testing, repair, or replacement. The '458 mechanism also requires external guide frames and anchor locations for automatic actuators and supports, such as foundations, that are not practical or economical. The '458 mechanism also lacks positive locking fastening elements that retain the clamp halves. Under pressure, predictable radial and tangential forces will force these clamp halves apart. Also, this device must be reconstructed, depending on its orientation with respect to gravity.

U.S. Pat. Nos. 3,310,329 and 4,347,944 disclose flanges that comprise a unitary clamp band remote actuated to liberate and secure flange members. In both of these devices, unacceptably high stresses will be generated at the midpoint of the clamp band farthest away from the separation gap in the clamp band. These stresses will alternate between very high compression to very high tension as the clamp band is cycled from the open position to the closed position. All economical materials available for construction of the clamp band will undergo unacceptable fatigue damage, effectively limiting the useful life of these flanges. By analogy, the clamp band of these mechanisms can be compared to a single piece of wire bent back and forth until severe fatigue damage separates it into two pieces.

To avoid the problem of severe fatigue damage associated with aforementioned inventions, the prior art has incorporated further degrees of freedom in the clamp band with hinges that articulate segments of the connector to alleviate high bending stresses. U.S. Pat. Nos. 2,982,437 and 5,471,739 illustrate such hinged connectors. The hinge in these mechanisms is an example of a single point failure location. Furthermore, the actuator or drive that opens and closes the clamp band is another single point failure location. U.S. Pat. No. 3,144,165 discloses yet another example of a single point failure mechanism. Succinctly, these single point failure mechanisms are inherently unsafe.

In addition, ASME Boiler and Pressure Vessel Codes give rules for the minimum acceptable safe construction of pressure retaining components. The prior art discloses automated clamp connecting means that are unsafe and are not ASME Code compliant. Accordingly, there remains a need for an remote operable fastener mechanism, preferably comprising a clamp-type connector, suitable for normal and extreme service that is simply, reliable, rugged, and above all, safe.

There is a need in industry to be able to remote open and close a joint frequently with safely articulated fasteners that further incorporate a clamp-type connector that can provide a very large crushing force suitable to seat crush-type gaskets, such as a metal gasket. A further need exists to supply such a clamp-type connector that preferably accounts for segment deflection; thereby mitigating contact interface surface damage and providing uniform clamping force to crush such gaskets even in a location away from the clamp segment fasteners.

There is a need in the industry to be able to remote open and close a joint frequently with safely articulated fasteners; wherein, the fasteners open and close the joint without turning a threaded member to produce such remote open and close function because threads are easily damaged especially in "dirty" operations. Moreover, operators using manually operated flanges benefit from a remote operable fastener mechanism adapted to quickly and simply retrofit such manual flanges to remote operation while accommodating at least part of the existing manual flange. Typically, an existing manually sealed flange pair will have been disposed on a vessel or pipe, such as a coke drum. A remote operable fastener mechanism, preferably comprising a clamp-type connector, that can utilize the manual flange already disposed on the units can generate significant process efficiency as well as improved safety for the unit.

SUMMARY OF THE INVENTION

All aspects of the embodiments of the invention draw attention to safety, simplicity, reliability, and ease of maintenance. The invention provides an important mechanism in providing a unique and safe system to remote operate the deposition of a pressure vessel. Remote operable is defined and used herein as the ability to operate without manual intervention from a location separated by distance. "Plurality" is defined to mean more than one similar or dissimilar items. The present invention comprises a substantially remote operable fastener, preferably incorporated into a clamp-type connector. This fastener comprises uniform sealing seal integrity to isolate internal volumes from the external environment, automatic primary remote operation, secondary manual operation, predictable operation using a small number of parts, and cost effective design. The embodiment is suitable for pressure retention and especially suitable for extreme pressure retention providing highly efficient access and enclosure in a batch-type operation of a low or extreme pressure vessel, and is especially suitable for high temperature or "dirty" operations. In other words, it is especially suitable for extreme service.

The current invention provides a unique and safe fastener that can be operated at a distance removed from danger and can be used to retrofit or replace existing manually bolted flanges. The invention may be preferably incorporated into a remote operable joint connector that is advantageous for safely deheading a coke drum by disconnecting or connecting an inlet pipe to a coke drum, the drum-bottom closure to the coke drum, and the drum-top closure to the coke drum.

A standard multiple-bolted flange, as described in ASME B16.5, and the invention produce an axial joint closing force necessary to sustain joint sealing integrity. The invention is designed to supply the closing force with a magnitude large enough to produce a contact stress on a gasket that creates a sealing barrier between the internal and external environments of the joint.

In a preferred embodiment, the fastener is an element of a clamp-type connector comprising a clamp whose perimeter is divided into a plurality of clamp segments conjoined by the fastener. The fastener conjoins the clamp segments such that the failure of any single fastener element will not unconjoin the clamp segments or cause failure of the clamp-type connector; therefore, forces acting on them cannot rend the clamp-type connector's articulation. The clamp perimeter of this embodiment can be cylindrical, but is not limited to a cylindrical profile. For example, joints may be rectangular or another known shape. Moreover, the joint can be opened and closed remotely or manually. A preferred embodiment incorporating the invention involves the inclusion of remote operable clamp segments, operable from a distant location.

The nature of the invention provides remote operation without compromising manual operation. Those skilled in the art will appreciate the self-contained nature of the fasteners, which allow the clamp-type connector to be manually opened and closed quickly, with only the use of a standard wrench. A significance of the invention's clamp-type connector embodiment is its ease in transition and functioning from manual to remote operation.

The clamp-type connector embodiment of the invention comprises a remote operable actuator that provides a connecting force to a redundant plurality of these fasteners. In a preferred embodiment of the invention, these fasteners may comprise threaded bolts. There is a number of other joining devices that can be substituted for threaded bolt fasteners. Cams, hooks, cables, spring loaded locking tabs, linkages, gear driven members, rack and pinion members, chain linkages, and other known devices could be incorporated into each fastener to move the clamp segments into a closed, sealing position.

Energizing the fasteners causes the clamp's perimeter to expand and contract in an opening and closing motion, liberating or retaining the flange members. When the perimeter of the clamp segments is increased, the female taper internal diameter of the clamp segments disengages the tapered male outer perimeter of the flange hubs. The male to female tapered interface between the flange hubs and the clamp segments allows the clamp segments to act as a restraint to effectively energize, lock, and secure the flange members together allowing a seal barrier to be created. Furthermore, the tapered flange hubs can create an axially compressing force that tends to drive the flange members into one another when the clamp is closed against the flange hubs. This closing occurs when the diameter of the clamp is contracted by the plurality of clamp segment fasteners. Therefore, gaskets requiring joint contact surface compression and/or seating force can be energized between the flange members creating a seal barrier to seal the vessel's internal environment from its external environment. Stored energy in the clamp segment fastener secures seal integrity.

In the clamp-type connector embodiment of the invention, a conical make-up shoulder is a mechanical advantage wedge that multiplies fastener force generated by the fasteners into a resultant clamping force forcefully draws coupled flange members together, in turn, producing significant gasket compression force on a gasket squeezed between them.

In the clamp-type connector embodiment of the invention, one of the conical make-up shoulders is replaced by a substantially straight, non-angled make-up shoulder, such as that disposed on manually bolted flanges like those described by ASME B16.5. This arrangement allows an existing manually bolted flange to be retrofitted for remote operable operation by removing the manual bolts and disposing the invention about an existing flange. Typically, an existing manually sealed flange pair will have been disposed on a pair of structural units to be joined. Hazardous conditions of or about the joining of this flange pair, or the benefit of decreased joint connecting and/or disconnecting time gives birth to the need for remote operable devices, such as the invention. Because the invention can utilize a manual flange already in use, significant cost saving is realized. Several advantageous attachment mechanisms and methods are discussed herein. Such attachments disposed the clamp-type connector embodiment of the invention on new or existing structures each has its own advantages.

Moreover, the invention may be incorporated into a remote operable mechanism to assure uniform closing force along the entire clamp segment-to-flange member contact surface interface. This unique feature incorporates clamp segments adapted to make controlled contact at or about the midpoint of the clamp segment farthest away from the clamp segment fasteners ("CC clamp segments"). Further, guide members are adapted to act on the clamp segments to guide the contact of the clamp segments with respect to the flange members producing a controlled predictable contact. This controlled contact, together with CC clamp segments, uniformly preloads the entire joint by initiating contact between the clamp segments and the flange members substantially near or about the clamp segments midpoint farthest away from the clamp segment fasteners. The actuating device member, acting on the clamp segment fastener, provides a closing force, transmitted into the clamp segments resiliently deflecting them. This resilient deflecting occurs as the CC clamp segments are energized and forced to engage the flange members by the clamp segment fasteners. The closing force first provides connecting preload substantially at or near the CC clamp segments' midpoints, then continuously provides the preload force closer and closer to the clamp segment fastener as the CC clamp segment is flexed about its midpoint. This unique feature causes the force on the clamp segment fastener to be uniformly distributed along each entire clamp segment-to-flange member contact surface interface. The uniform preload at the contact surface, in turn, supplies a uniform sealing force on the flange member-to-gasket member contact surface, creating a barrier between the joints' internal and external environments.

Moreover, a unique way to assure the uniform preloading can be effectively incorporated with a remote operated joint opening and closing mechanism is shown in a preferred embodiment that utilizes guide pins attached to the clamp segments. These guide pins are restricted to travel in passageways fixed with respect to at least one flange member. The fixed motion of the guide pins, in turn, guides the radial motion of the clamp segments, relative to the flange members. This motion causes the clamp segments' midpoints to return to the flange members at a predictably controlled location every time the clamp segments are remote actuated from the clamp segments' open positions to the clamp segments' closed positions.

When the clamp segments are secured to the flange members, friction between the flange members and the clamp segments tend to lock the clamp segments onto the flange members. CC clamp segments are resilient and when energized, are forcefully flexed into engagements with the flange members and energy is stored. This energy tends to return the clamp segments to their free state, away from the flange members; thereby, producing a relative unlocking force between the clamp segments away from the flange members that overcome the friction force holding them together. Those of ordinary skill in the art will appreciate the substantial benefit of this feature, which reliably overcomes the locking friction force between the clamp segments and the flange hubs, and the importance of this feature to the effective remote operable connecting and disconnecting of a joint.

In typical Delayed Coking applications well over a 1,000,000 pounds of force must be produced to obtain seal integrity at the drum-bottom flange. Even considering the number of connection and disconnection cycles over the typical life of a coke drum under such force, CC clamp segments dispel concerns of surface damage or wear at the clamp segment-to-flange member contact surface. Of course, surface damage or wear is directly related to the contact stress produced by the forces drawing the surfaces together. The contact stress in such an application is well below 4000 pounds per square inch. Furthermore, CC clamp segments' initial contact positions are substantially the same as their final closed positions so very little sliding occurs between the clamp segments and the flange members, dispelling wear over the typical life of a coke drum. Compared to the prior art, in which wear may have been of concern, wear is not noticeably observed in the current invention.

In the closed position, the flange hubs have generally male conical profiles that mate with the clamp segments' generally female conical profiles. The overlaying of the mating contact surfaces throughout a substantial part of the entire conical contact length insures proper contact with the mating flanged surfaces.

The clamp-type connector embodiment of the invention also allows for the creation of a self-contained mechanism. This embodiment does not require external devices, such as foundation reaction points or motion limiting devices, to function properly. The clamp segments can be further self-contained by incorporating the passageways for the pivot pins, and other clamp support passageways, into a self-containing support ring or a support plate that can dispose the clamp segments. These self-containing rings fix the orientation of the passageways, such that the clamp segments are guided from the open position to the closed position, relative to the flange members, and relative to each other, to assure proper connection and disconnection of the joint. Moreover, this self-contained clamp assembly can be removed as a single unit from the flange members quickly and easily for preventative maintenance. This approach is especially useful in a subsea environment where remote operable vehicles could retrieve this modular clamp assembly for easy transport to the surface, and replace the assembly with a new assembly, leaving flange members at their subsea location. Additionally, the fastener serves the dual purposes of containing and actuating the clamp segments, thus securely holding the gap between the clamp segments closed.

Advantageously, the fasteners may be of any construction. For safety reasons the clamp segment fastener elements should not comprises a failure path that could cause an opening of the gap upon failure of any one component. There are a number of clamp segment fasteners that would suffice to perform this function. Cams, hooks, cables, spring loaded locking tabs, linkages, gear driven members, rack and pinion members, chain linkages, swing bolts, and other known devices could fastener to unite the clamp segments.

Moreover, in the prior art, the transition between remote and manual operation is complicated. Some remote operated mechanisms must be disconnected before manual operation can occur. Moreover, the manual operation of these devices was both labor intensive and complicated by the remote operation. In contrast, the current fastener can be remote energized to either open and unlock the clamp gap or close and lock the clamp gap, both by remote actuable drive members or manually without disconnecting any components. This arrangement allows primary remote operation to be married with secondary manual operation.

The energy supplied to the clamp segment fastener by the remote actuable drive member is positively stored by the clamp segment fastener, thus securing the gaps between the clamp segments and locking the clamp-type connector onto the flange members even if the remote actuable drive member is disconnected. This feature allows the joint connection to remain safely and securely sealed, independent of the remote actuable drive member. Moreover, this arrangement allows energy stored in the clamp segment fastener to be increased or decreased manually even after it has been locked.

Additionally, any known actuable drive member, such as hydraulic or pneumatic cylinders or motors may energize the fasteners. Known mechanical advantage devices, such as gears, wedges, linkages, and cams could be incorporated with the actuable drive member. The fasteners can be adapted for interlock mechanisms to prevent inadvertent remote operation and such interlock mechanisms can be passive or active along with being force of pressure sensitive.

As was the case with the clamp-type connector embodiment, the fastener may interact with the clamp segment in a self-contained assembly. This assembly does not require external anchors or reaction structures to operate. Also, the clamp segment fastener will limit the opening motion of the clamp segments autonomously, and thus not require additional motion limiting devices.

The fastener is further adapted for remote tightening by utilizing a forgiving wedged locking device that can advance to easily adjust for varying magnitudes of standoff and applied force. The locking device interacts with a wedged clevis nut and is adjustably fixed to one of the structural units being fastened. A manual interlock holds the locking device in a locked position preventing remote operation when it is engaged against the locking device. As an alternate safety feature, a remote actuable drive member can be a spring-extend hydraulic cylinder such that when the remote actuable drive member is un-powered, spring force tends to force the locking device its locked position. The wedge angle will be preferably small so as to be self-locking due to friction contact. Those skilled in the art can easily derive wedge angle.

A resilient deflection is noticed in the clamp segments when fastener force is applied to them. If not accounted it can lead to non-uniform gasket compression force distribution along the clamp segment-to-flange member contact surfaces when deflection causes the clamp segments to produce more force on the mating flange members near the end of its segments. Of course, non-uniform gasket compression force distribution makes a joint susceptible to leaks.

Gaskets standoff initially holds the coupled flange members apart until the clamping force draws down the flanges, compressing and seating the gasket to producing a sealed joint. In a clamp-type connector embodiment of the invention, the clamp segments are adapted to make controlled contact at or about the midpoint of the clamp segment between the fasteners to provide uniform clamping force. CC clamp segments can be predisposed by forming or over-sizing to account for the aforementioned deflection. Fasteners deflect CC clamp segments into engagement with the flange members and tend to separate from flange members when un-energized by fasteners.

Compared to the mating of exact-sized clamp segments to flange members, CC clamp segments substantially reduce the distance the CC clamp segments must move under clamping force. Also, the initial contact area between the CC clamp segments and flange members is significantly greater than in the corresponding prior art mating components. Smaller open position gaps result in cost savings because the components of the fastener can be much shorter. Additionally, the open perimeter of the CC clamp segments is much smaller, saving space. Also frictional forces holding clamp segments onto the flange members are substantially overcome by the outwardly flexing action of the CC clamp segments away from the flange members when initially opened.

In a clamp-type connector embodiment of the invention, CC clamp segments are further adapted to maximize initial area contact between the flange members and the CC clamp segments. In this embodiment, CC clamp segments connecting to the flange members mitigate wear at the contact interface. When the CC clamp segments are moved on and off the flange members, the contact stress on the contact interface is significantly lowered because the contact area between the CC clamp segments and flange members is greatly increased.

The CC clamp segments, the fasteners, the remote actuable powered drive members, the locking devices, and the remote actuable powered locking devices actuators can all be functionally assembled in a self-contained portable assembly that can be disposed on flange members. Several attachment details are appropriate to dispose such assembly to the flange member or a vessel. The assembly can be mounted to the vessel or to a structural unit such as a flange member.

In Delayed Cokers it is advantageous to quickly adapt a manual bolted flange to a remote operable connector on the existing coke drum flange without the use of a bolted spool adapter for bolting the remote operable connector to the existing flange. In doing so more than one seal must be achieved. The clamp-type connector embodiment of the invention can be disposed on the existing flange without welding to the coke drum and only one seal must be achieved. This presents very significant cost savings to coke drum owners who would potentially shutdown their operation to install a new coke drum flange. Advantageously, the invention can be installed between Delayed Coking cycles.

A cleaning mechanism and cleaning method useful in the clamp-type connector embodiment provide for a cleaning substance, like steam, to cleanse all contact interfaces including the gasket interface with the flange members. It comprises a perforated conduit adapted between the inside of the clamp segments and the outside of the flange members. It can be segmented similarly to the clamp segments. This cleaning mechanism is especially useful in "dirty" operations such as Delayed Coking. The clamp-type connector embodiment of the invention can be used to automate a Delayed Coking process to increase efficiency and safety. It can remote connect or disconnect a feed line, a drum-bottom head, a drum-top head, a decoke chute or a drill stem centralizer to the coke drum.

In a preferred embodiment, the remote operable fastener comprises a plurality of threaded bolts. If one bolt fails, the additional bolts provide the safe articulation needed for safety.

Advantageously, the design of the invention and its incorporation into a clamp-type connector allows for dry assembly of the component parts. No grease or other lubricants are required during assembly. Furthermore, depending upon the material from which the components are manufactured, this fastener can be utilized in environments up to 1800° F.

BRIEF DESCRIPTION OF THE DRAWINGS

FIG. 4b is an exploded partial section view similar to FIG. 4a. FIG. 4b illustrates a preferred embodiment of the clamp segments and flange members, wherein a force adjuster 60 interfaces the clamp segments and further interfaces the flange members through bearing 61.

FIG. 9 shows the top plan view of the automated clamp-type connector partially sectioned. For clarity, FIG. 9 has a clamp support bracket radially removed from its true position by distance 52.

FIG. 18 illustrates a continuous support plate containing the passageways 50 and 46. FIG. 18 shows another preferred embodiment of the fasteners 55 having a manual safety interlock and a remotely adjustable tightening mechanism.

DETAILED DESCRIPTION OF THE PREFERRED EMBODIMENT

The invention relates to fasteners to be preferably used in clamp-type connectors that may be used to remote operate on containment vessels. The invention comprises at least one fastener to be used in remote operable clamp-type connectors that increase safety to connect structures such as an inlet pipe to a vessel, a drum bottom closure to an opening in the vessel, or a drum-top closure to the vessel in the preferred embodiment of use.

It should be noted that while this fastener may be used in nearly any environment though most preferably on vertically oriented vessels and openings, but may also be used to secure joints in other structures, vessels, or pipes in any orientation. While generally applicable to any structure, vessel, or pipe, this disclosure describes its use on coke drums. More broadly, this fastener aids in the joining or securing of other types of structural units, such as supports, pylons, conduits, pipes, other vessels, terminators, or other types of structures.

Figure 1:
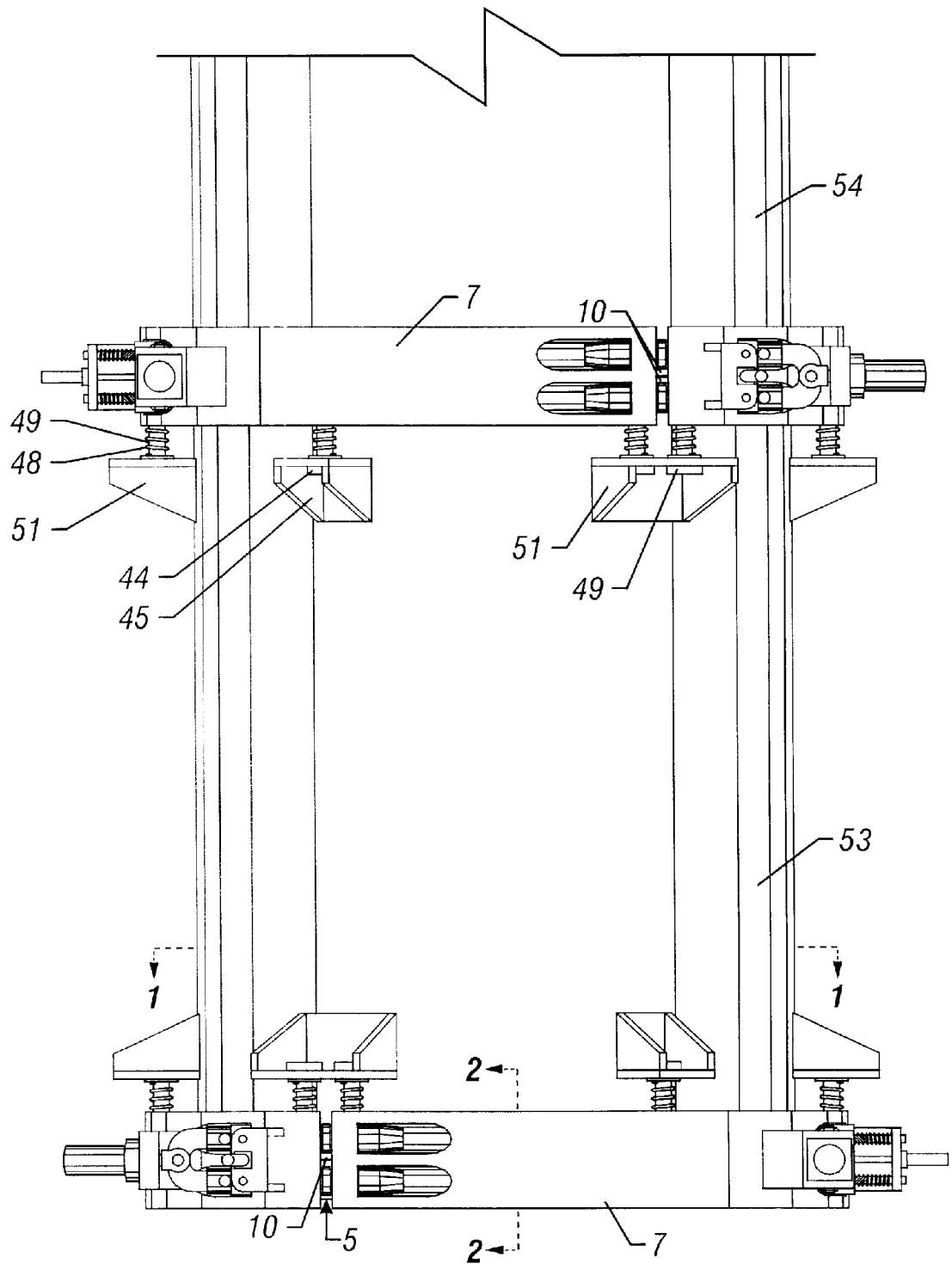
FIG. 1 is an elevation view of a vertical vessel with a preferred embodiment of the invention, incorporated into clamp-type connectors, attaching sections of a vertical vessel.

FIG. 1 shows two such orientations using the invention. Referring to FIG. 1, in a first orientation (upper portion of FIG. 1), a joint between vertical vessel sections 53 and 54 is connected by an embodiment of the invention. Vessel sections 53 and 54 have flange members 10 sealingly secured by a clamp segments 7. The clamp segments 7 are supported by springs 48 on guide pins 44 and 49 that are movably attached to supports 45 and 51. Similarly, in a second orientation (lower portion of FIG. 1), ajoint between the vessel section 53 and a flange member 5 is secured by an embodiment of the invention. The vessel section 53 and the flange member 5 have flange hub ends 11 and 21 sealingly secured by clamp segments 7. These, in turn, are supported by springs 48 on guide pins 44 and 49 that are movably attached to supports 45 and 51.

Figure 2:
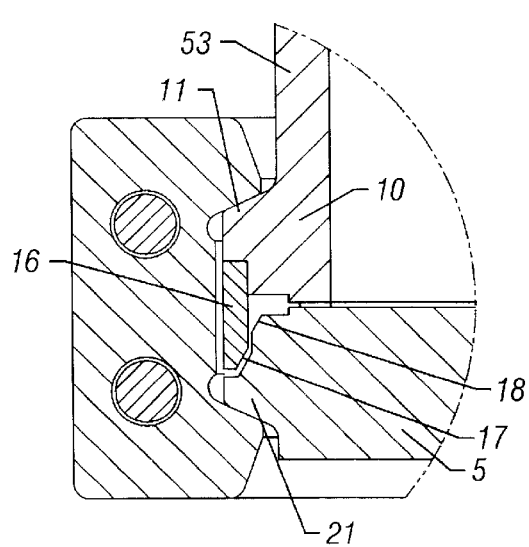
FIG. 2 is a partial section view similar to FIG. 4, illustrating a preferred embodiment of a self-aligning feature for the flange members. Bolts 8 are rotated in view from their true position.
Figure 3:
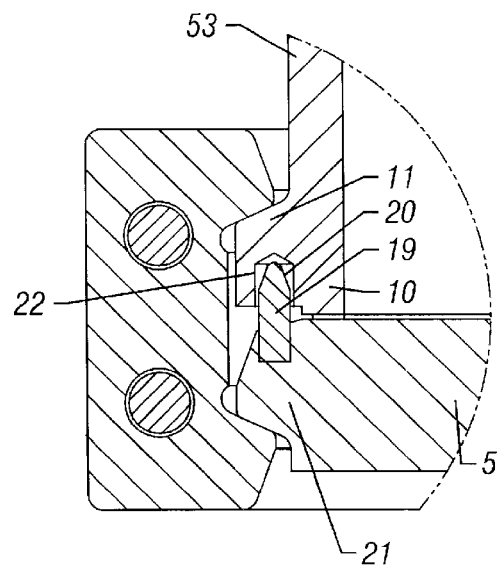
FIG. 3 is a partial section view similar to FIG. 4, illustrating a preferred embodiment of a self-aligning feature for the flange members consisting of box and pin members equally space around the flange members. Bolts 8 are rotated in view from their true position.
Figure 4:
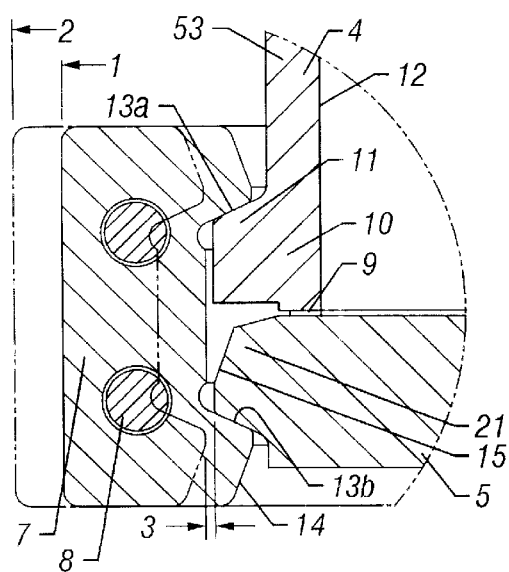
FIG. 4 is a partial section view of a preferred embodiment of the clamp segments and flange members, as seen along the line 2—2. Bolts 8 are rotated in view from their true position.

The relationship between the flange members 5 and 10 and clamp segment 7 is better shown in FIGS. 2–4. The second structural unit, flange member 5, is applied in a gasketed, sealing relationship to the first structural unit, flange member 10, and acts as a lid closing the internal volume of vessel section 53. Other preferred embodiments of the clamp-type connector can connect any plausible outer perimeter joint configuration, such as, but not limited to, cylindrical, elliptical, parabolic, oval, or polygonal or any other perimeter having flange hub ends.

FIG. 4 shows two flange members 5 and 10 in an abutting engagement with clamp segments 7. Flange member 10 is attached to the vessel section 53 at a neck 4. The flange member 5 is the closure at the opening in the vessel section 53. FIG. 4 illustrates a vessel closing device in which two flange members 5 and 10 both have matching outer clamp-engaging surfaces and are secured by the clamp segments 7.

Figure 4A:
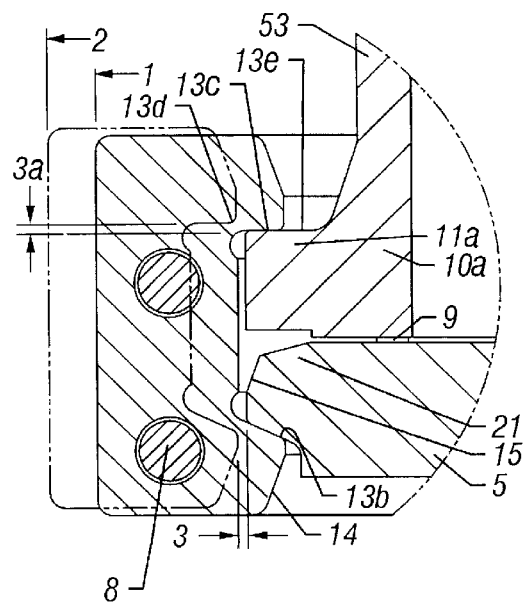
FIG. 4a is a partial section view similar to FIG. 4, illustrating a preferred embodiment of the clamp segments and flange members, wherein at least one flange member to clamp segment contact shoulder is substantially non-angled. Bolts 8 are rotated in view from their true position.

Flange member 10 is normally attached to the neck 4 by welding. Although not shown in FIG. 4, those skilled in the art will appreciate that the flange member 10 can be secured to the neck 4 by any number of fastening mechanisms, such as a threaded connection like a bolt. The neck 4 and the flange member 10 preferably have an internal perimeter 12 that is substantially collinear. As shown in FIG. 4, each flange member 5 and 10 has at least one radially outwardly extending flange hub 11 and 21. Each hub contains make-up shoulders 13a and 13b. In this embodiment, the hub make up shoulders are conical in nature, but it should be noted that other embodiments of the shoulder could be spherical, convex, or concave, among others. The make-up shoulders could be flat as shown in FIG. 4a, thereby allowing an existing manually bolted flange member disposed on vessel 53, such as a vessel 56, to be retrofitted for remote operable operation.

Each flange member 5 and 10 may contain a plurality of flange hub ends 11 and 21 each containing make-up shoulders 13a and 13b. The clamp segments 7 would have the same number of make-up shoulders 13a and 13b as each flange member 5 and 10. The internal perimeter of the clamp segments 7 and the external perimeter of flange members 5 and 10 can interface each other in a conical male to female fit. Make-up shoulders 13a and 13b are contact surfaces between clamp segments 7 and flange members 5 and 10. These contact surfaces can make sliding contact or can be adapted with rollers to make rolling contact on a roller bearing surface.

When no energy is present in the clamping segments, they are said to be in the free state. In the free state, the clamping segments may put the clamping mechanism into either the open or closed position, depending on the bias of the segments used. When energy is stored in the clamping segments, the clamping mechanism will change state to either the open or closed state, once again depending on whether the segments are biased open or biased closed.

For illustrative purposes, a clamping apparatus utilizing open biased segments is used. That means, in the free state the clamping device is put into the open state. When energy is stored in the clamping segments, the segments flex and put the clamp into the closed state. One skilled in the art will realize that a clamp biased closed could just as easily be designed using the techniques described herein.

When the clamp segment conjoining elements ("bolts 8") are tightened, they force the perimeter of the clamp segments 7 to contract into flange members 5 and 10. This contraction is illustrated by the movement of clamp segments 7 from a open perimeter, shown as position 2 in FIG. 4, to a closed perimeter, shown as position 1 in FIG. 4. The conical make-up shoulders 13a and 13b transmit and multiply the force applied to bolts 8 through flange hub ends 11 and 21. This force drives members 5 and 10 together causing a large compressive load on gasket 9 in a sealing relationship between the flange hub ends, thus isolating the internal environment from the external environment of the vessel.

Referring to FIG. 4, in order to liberate the flange members 5 and 10 from clamp segments 7, the clamp segments 7 are moved away from their closed position 1 to their open position 2 creating a clearance 3 that allows the outer perimeter of the flange members 5 and 10 to separate from the inner perimeter of the clamp segments 7. This allows the joint between vessel 53 and flange member 5 to be disassembled.

In a preferred embodiment of the invention, the clamp segments 7 are mounted to a flange member 5 or 10. One of the flange members to which the clamp segments 7 are mounted is generally attached to a structure, typically expected to be substantially stationary, i.e. the vessel section 53.

In an embodiment of the invention, movable flange member 5 or 10 mates to the substantially stationary flange member 5 or 10. An alignment feature causes the movable flange member 5 or 10 to return to a substantially collinear relationship with respect to the substantially stationary flange member 5 or 10, so clamp segments 7, when closed, can sealingly secure the mating flange members 5 and 10 together. The internal perimeter of the clamp segments 7 has a receiving taper 14 that interfaces with the outer perimeter of the movable flange member 5 or 10 along a taper 15, creating a means to accommodate gross misalignment during initial alignment of the flange members. Interaction between the taper 15 and the taper 14 will force the movable flange member 5 or 10 into a more collinear relationship with respect to the substantially stationary flange member 5 or 10.

Referring to FIG. 4a, the apparatus in this figure is substantially similar to the apparatus in FIG. 4. Here the conical make-up shoulder 13a is replaced by a substantially non-angled make-up shoulder 13e, such as disposed on typical manually bolted flanges. These make-up shoulders can make sliding contact or can be adapted with rollers to make rolling contact on a roller bearing surface.

Figure 4B:
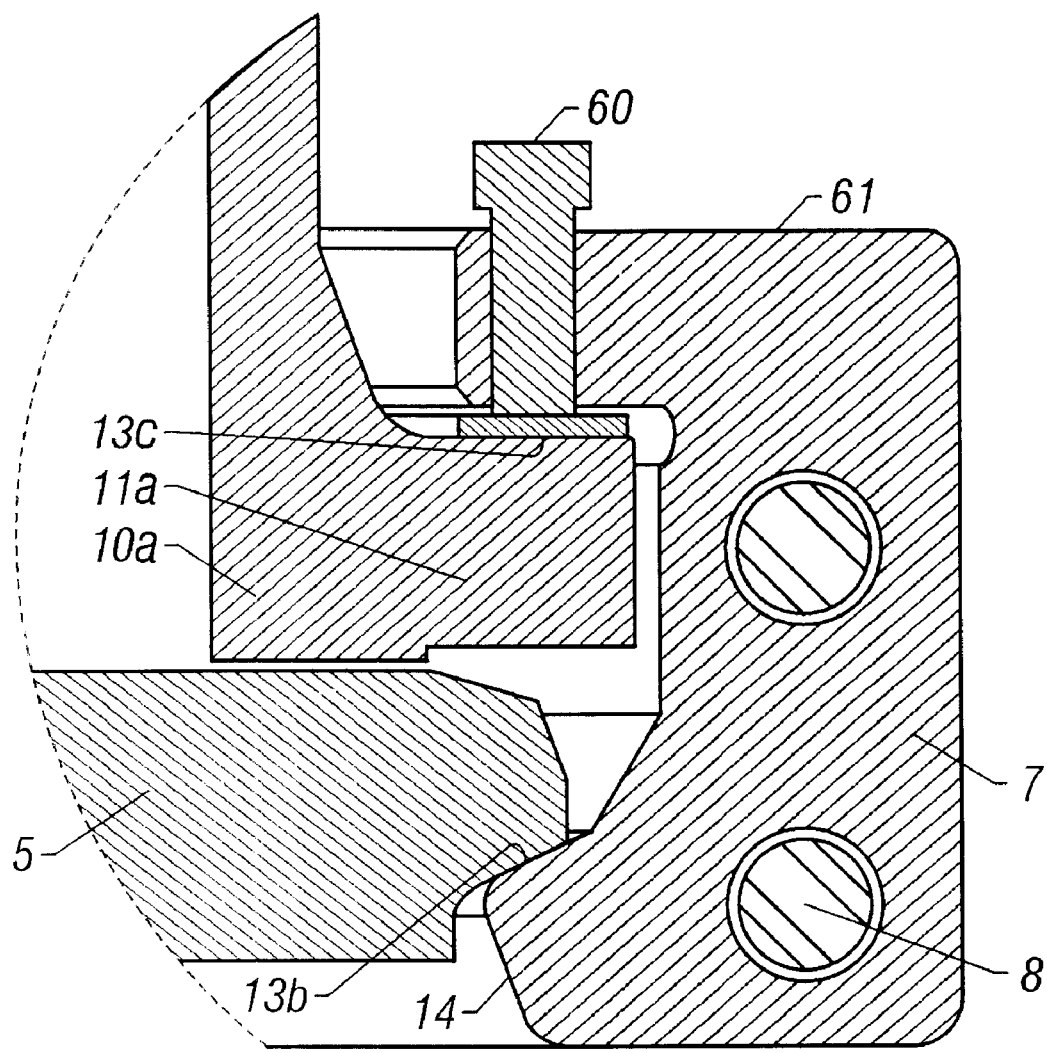

FIG. 4b is an illustration of an embodiment of the invention adapted to a manually bolted flange member 10a. A plurality of force adjusters 60 are disposed along clamp segments 7 and spaced apart from one another. Force adjusters 60 can form a threaded interface with clamp segments 7; however, some other force reacting interface would suffice. When force adjusters 60 are adjusted the force between clamp segments 7 and flange members 5 and 10a changes causing the stored energy to change. This force adjustment can occur differentially along the length of clamp segments 7.

A bearing 61 can be placed between bolts 60 and flange member 10a and/or flange member 5. The force adjusters 60 could make a roller contact with the bearing 61 or the surface 13c of flange member 10a. These force adjusters 60 can also be incorporated with clamp-type connectors similar to FIG. 4.

Figure 14:
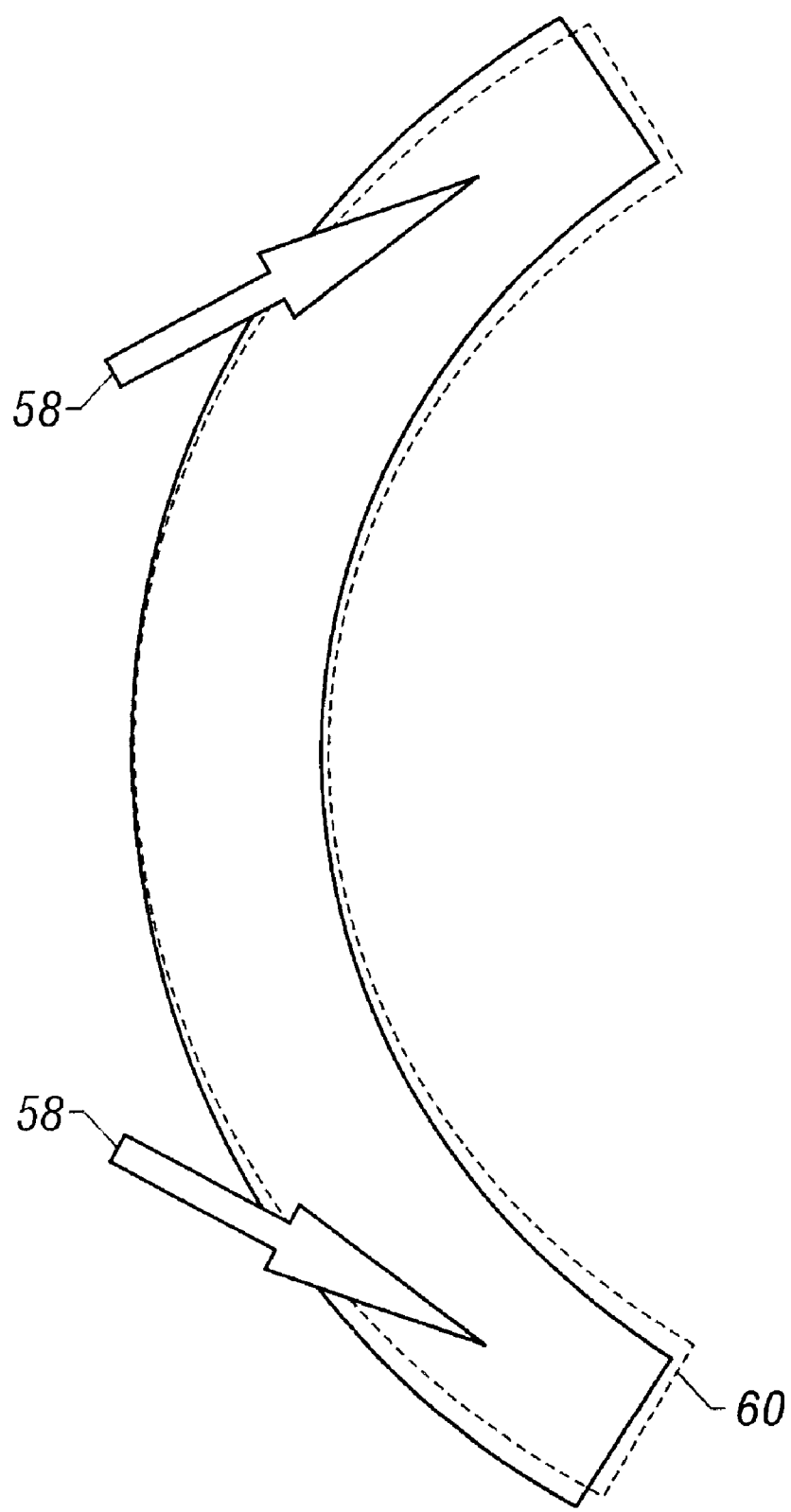
FIG. 14 is a top plan view of a clamp segment showing exaggerated deflection of the clamp segment produce by the fastener 55 force.

The embodiments of FIGS. 4a and 4b allow an existing manually bolted flange to be retrofit for remote operable operation by removing the manual bolts and adapting the invention about an existing flange 10a having flange hub end 11a. FIG. 14 illustrates a preferred arrangement for adapting the invention about a typical manually bolted flange. Generally, an existing manually bolted flange pair will have been disposed on vessel 53 or a pipe. Hazardous conditions of or about the joining of this flange pair or the benefit of decreased joint connecting and/or disconnecting time gives birth to the need for remote operable devices, such as the invention. Because the invention can utilize a manually bolted flange 10a already disposed on a vessel 53, such as on vessel 56, significant cost savings is realized by retaining the investment in flange 10a, avoiding the expenses of removing this manual flange 10a, avoiding the cost of a replacement flange 10, avoiding the expense of fabricating new flange 10 to vessel 53, and the savings of avoidable downtime and the loss of production during this downtime.

In the foregoing arrangement it is beneficial for the clamp segment's open positions to be sprung such as to create a distance 3a between make-up shoulder 13c's open position and its closed position, thereby assuring reliable engagement of clamp segments 7 with the flange hub end 11a. Lead-in angle 13d is applied to further assure the foregoing reliable engagement.

The placement of bolts 8 may be biased toward the tapered shoulder 13b, farther away from shoulder 13c, as shown in FIG. 4a and FIG. 14. This placement would differ from the relatively equal distant placement of bolts 8 between two equally angled make-up shoulders as shown in FIG. 4. Those skilled in the art will realize this biased placement accommodates the load eccentricity created by dissimilarly angled make-up shoulders, such as 13b and 13c.

Referring to FIG. 2, an embodiment of a clamp-type connector utilizing the present invention includes a fine aligning mechanism. An aligning plate 16, preferably constructed from rolled plate, is attached to the flange member 5 or 10. The aligning plate 16 has a receiving taper 17 along its inner perimeter for receiving the flange member 5. The opposite flange member to which the aligning plate 16 is attached will have an interfacing taper 18 that interacts with the taper 17.

Referring to FIG. 3, another embodiment of a fine aligning feature consists of a box and pin type arrangement. A pin 19 has a tapered nose 20 that interfaces with box 22 to align flange member 5 to flange member 10. This box to pin arrangement will be utilized to align other devices embodying the invention, and will be referred to by these numbers without particular reference to flange to flange alignment.

Figure 5:
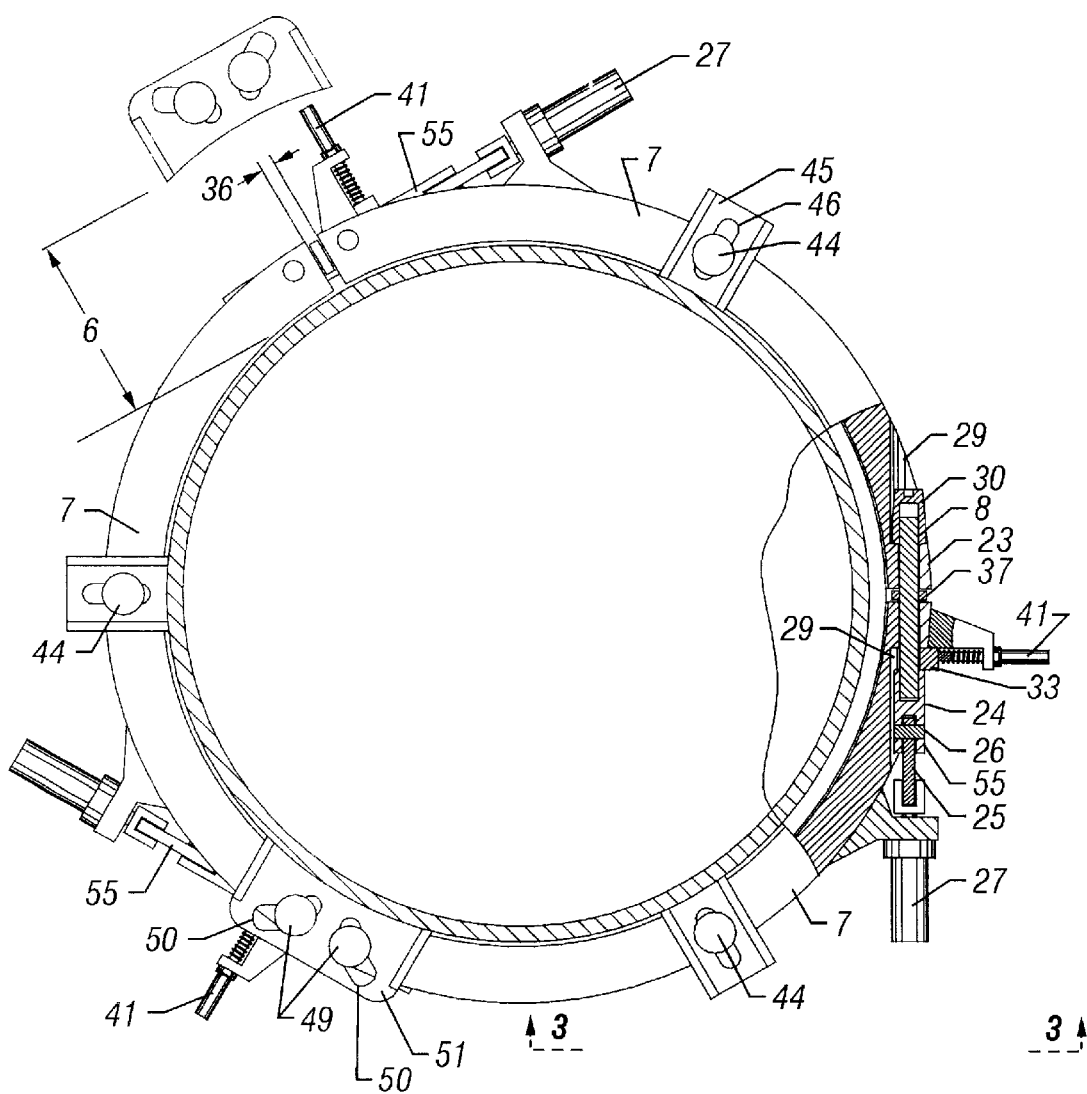
FIG. 5 is a top plan view, partially sectioned, of the contracted position of a preferred embodiment of the invention as seen along the lines 1—1. For clarity, FIG. 5 has a clamp support bracket radially removed from its true position by distance 6.
Figure 6:
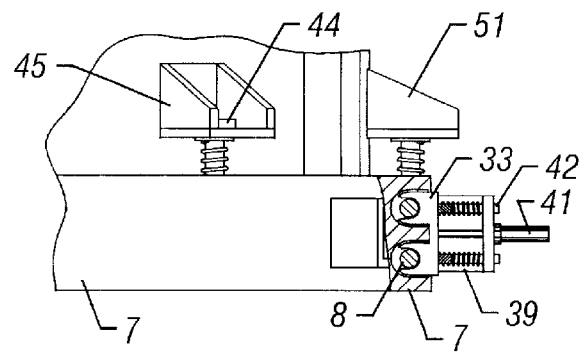
FIG. 6 is a partial side view, partially sectioned, of the automated clamp-type connector of FIG. 5 as seen along the line 3—3. The partial section shows the relationship between bolts 8 and locking devices 33, while in the closed position.
Figure 7:
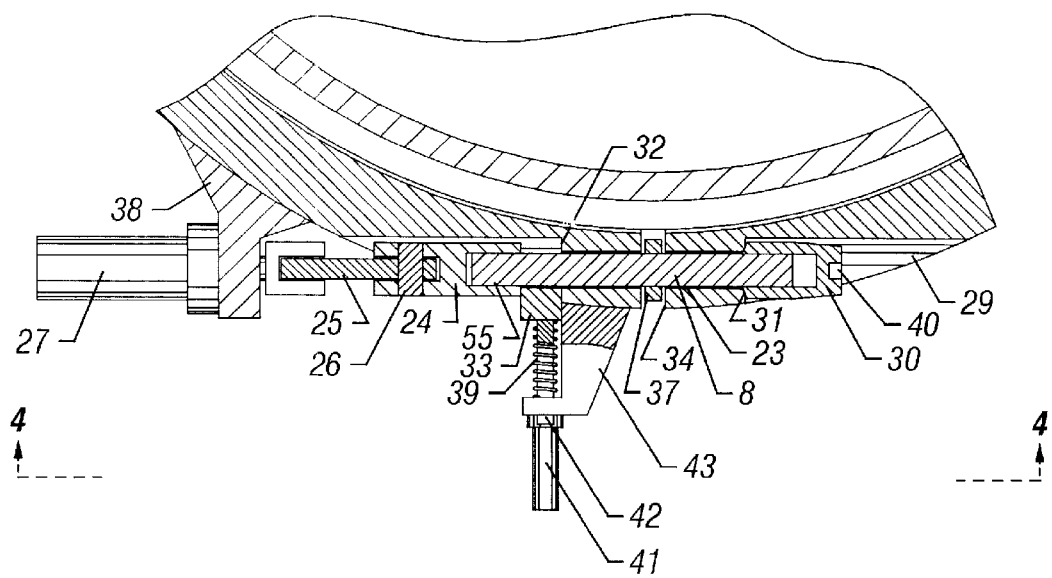
FIG. 7 is an enlarged view of the partial section shown in FIG. 5 illustrating a preferred embodiment of the invention, focusing on a preferred embodiment of the redundant clamp segment fastener as seen along the line 5—5.
Figure 8:
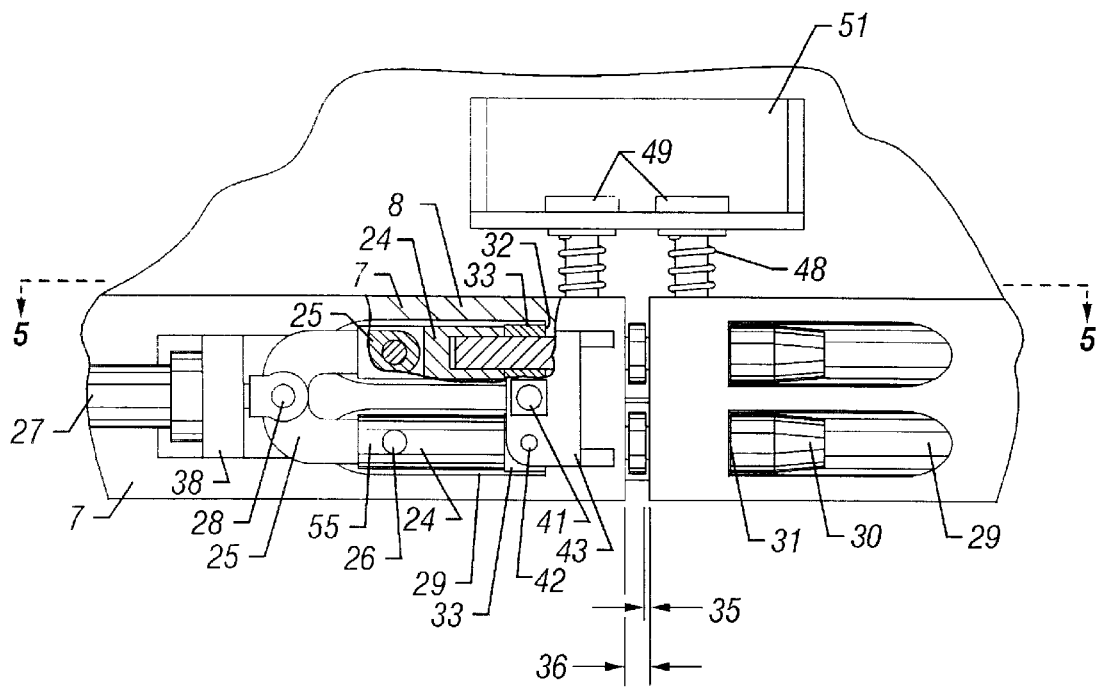
FIG. 8 is a partial side view, partially sectioned, as seen along the line 4—4, illustrating a preferred embodiment focusing on a preferred embodiment of the redundant clamp segment fastener.

Referring to FIGS. 5–8, most identifying number labels are shown in FIGS. 7 and 8 because they are enlarged partial views of FIG. 5. In a preferred embodiment of the invention, as shown in FIG. 5, the clamp-type connector is divided into three separate clamp segments 7 at gaps 36. Each clamp segment division is defined by the gaps 36. A preferred embodiment of the present invention, a clamp segment fastener 55, conjoins and interacts with the clamp segments 7 across gaps 36, controlling the magnitude of gaps 36 and securing gaps 36 such that clamp segments 7 are positively locked onto flange members 5 and 10. In a preferred embodiment of the invention, each clamp segment fastener 55 comprises a plurality of threaded bolts 8 with a locking nut 30, a locking device 33, a clevis nut 24, a motion limiting device 37, a yoke 25, pins 26 and 28, and at least one remote actuable drive member 27.

An operator at a remote operable panel can activate the remote actuable powered drive member 27, causing the clamp segment fastener 55 to automatically drive clamp segments 7 to an expanded open position or to a contracted closed and locked position.

In a preferred embodiment of the invention, the clamp-type connector utilizing fasteners 55 is divided into a plurality of segments 7. Three clamp segments 7 are generally a preferred embodiment for large joints and two clamp segments 7 are generally acceptable for smaller joints. It should be noted that the clamp segments can have reduced sections, such as notchings, for providing further flex to the clamp segments.

Moreover, the clamp-type connector utilizing fasteners 55 may further comprise a passageway 23 in the clamp segments 7 made to accept bolts 8. As shown in FIG. 5, the passageway 23 and bolts 8 are substantially tangent to and passing through the clamp segments 7. Attached to the bolts 8 are threaded clevis nuts 24. Attached to the clevis nut 24, by a pin 26, is a yoke 25. In turn the yoke 25 is attached to a remote actuable powered drive member 27 by a pin 28. A passageway 29, substantially collinear to the passageway 23, is made to accept the clevis nut 24, locking nut 30, and the locking device 33. Because the several locking means 24, 30, and 33 cannot pass through the passageway 23, the junction of passageway 29 and 23 form reaction shoulders 31 and 32 (FIGS. 7 and 8).

To remote close and lock the clamp segments 7 and, thereby, produce an effective sealing barrier between the vessel's internal and external environments, a signal is sent from a remote operable panel (not shown) that causes a power supply (not shown) to activate the remote actuable powered drive member 27. The remote actuable powered drive member 27 pulls yoke 25 towards anchor 38 attached to clamp segments 7. The yoke 25 evenly distributes a stretching force into bolts 8. Because the locking nut 30 cannot pass through the passageway 23, the locking nut 30 contacts the clamp segments 7 at the reaction shoulders 31, pulling the adjacent clamp segments together, thereby effectively reducing the clamp segments' perimeters. This reduction in perimeter of the clamp segments forces flange members 5 and 10 together and supplying a compressive sealing force on gasket 9.

Figure 10:
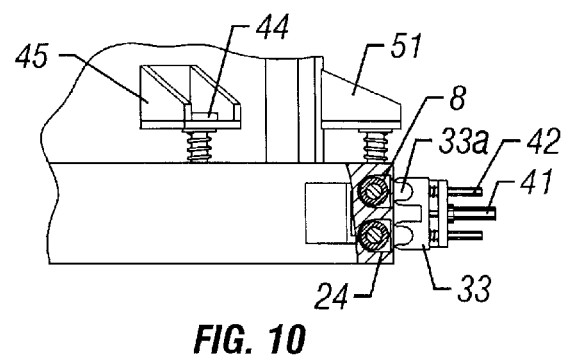
FIG. 10 is a partial side view, partially sectioned, of the automated clamp-type connector of FIG. 9 as seen along the line 6—6. The partial section shows the relationship between fastener 8, locking device 33, and clevis nut 24, while in the open position.
Figure 11:
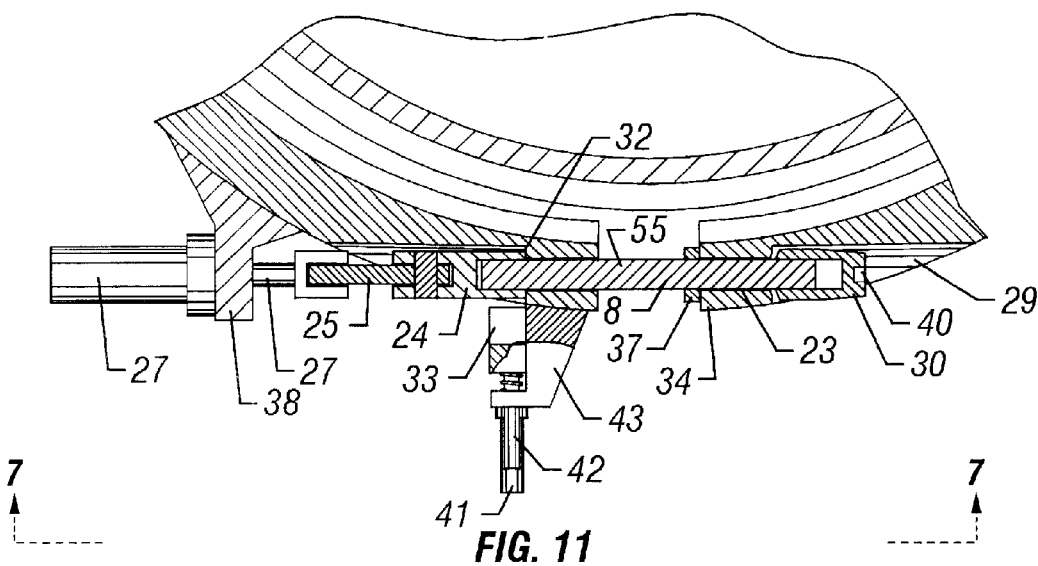
FIG. 11 is an enlarged view of the partial section shown in FIG. 9 illustrating a preferred embodiment of the invention, focusing on a preferred embodiment of the redundant clamp segment fastener as seen along the line 8—8.
Figure 12:
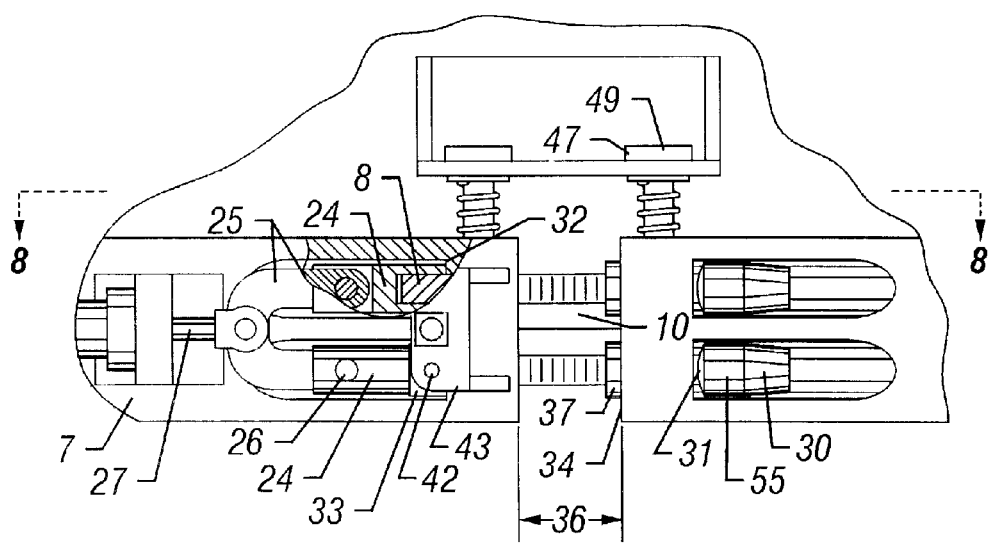
FIG. 12 is a partial side view, partially sectioned, as seen along the line 7—7, illustrating a preferred embodiment of the invention, focusing on a preferred embodiment of the redundant clamp segment fastener.

Locking nut 30 and reaction shoulders 31 interface each other in a male to female spherical radii fit so as to prevent significant bending stress in bolts 8. When the remote actuable powered drive member 27 causes a significant stretching force in the bolts 8, the bolts 8 elongate enough to allow the locking devices 33 to fit between the clevis nuts 24 and the reaction shoulders 32. The locking devices 33 have passageways 33a (FIG. 10) to allow passage of the bolts 8 but not allow passage of clevis nuts 24, thus positively locking the closing stored energy in the stretched bolts 8, and allowing isolation of the remote actuable powered drive member 27.

Because the remote actuable powered drive member 27 is energized by a remote power source, the remote actuable powered drive member 27 is generally not relied on to act as a continuous fastener to retain stored energy. It is beneficial to terminate the power source after energizing and locking bolts 8 with locking devices 33.

As shown in FIG. 6, the locking devices 33 have "C" shaped sections, which allow the bolts 8 to fit into the opening 33a of the "C" shaped sections. At the openings in the "C" shaped sections of the locking devices 33, tapers account for misalignment of the bolts 8, the clevis nut 24, and the passageways 29 with said locking devices 33. During tightening, when sufficient clearance is achieved under the clevis nuts 24, the remote actuable powered locking device actuator 41 advances the locking device 33 under the clevis nut 24, power to the remote actuable powered drive member 27 can then be disconnected. The clevis nut 24 reacts on locking device 33. Because the bolts 8 were significantly stretched from their original length, they will now maintain a substantial stored energy that will secure the clamp segments 7 onto the flange members 5 and 10. Although not required, but added as safety elements, springs 39 hold locking devices 33 from moving when the remote actuable powered locking device actuator 41 is disconnected from the power source. The springs 39 contribute to moving the locking device 33 into locking position when the remote actuable powered drive member 27 has created sufficient clearance between the clevis nut 24 and the locking device 33. The locking device 33 is a positive locking element that locks the stored energy into clamp segment fastener 55 without relying on friction or a power supply to maintain the stored energy.

Locking devices 33 can be simple ridged structural elements. A cam lock made to interface clamp segment 7 and locking device 33 could also hold locking device 33 into the closed and lock position. Locking device 33 could also make a slight angled contact with clevis nut 24 allowing the fastener 55 to be further remote tightened once the locking device is locked by simply stretching bolts 8 and advancing locking device 33's angled contact. This action further engages clevis nut 24 and results in more stretch in bolts 8.

The magnitude of the angled contact could be made to be less than the contact friction angle, thus producing a self-locking or positive locking effect. This contact surface could also be serrated with interlocking teeth.

In another embodiment, clamp segments 7 are comprised of a segmented ring with external lugs. Each external lug contains passageways 23 and has reaction shoulders 31 and/or 32. The lugs are located near the ends of the clamp segments farthest away from the midpoint of the clamp segment.

Clamp segment fastener 55 is either remote or manually operable without changing or disconnecting any parts of the clamp. This provides very quick transition between remote and manual operation. To manually close the clamp-type connector, the user may simply tighten threaded locking nuts 30 on the bolts 8. A standard wrench interface 40 is provided to locking means 30 to allow the manual tightening of the bolts 8. Alternatively, the user may attach a portable power supply to the remote actuable powered drive member 27. Ease in transition between remote and manual operation is a very useful feature.

In another embodiment of the clamp segment fastener 55, the force applied to the bolts 8 can be increased, decreased, or verified at any time without disconnection of any members simply by turning locking nut 30 with a standard wrench.

In another embodiment, bolts 8 are adapted for spring centralizers that forcefully centralize the bolts 8 in passageways 23.

In another embodiment, bolts 8 or passageways 23 are adapted for bearings to ease the relative motion of these components.

The remote actuable powered drive members 27 are connected in series such that a power source, connected to the remote actuable powered drive member 27, supplies the same amount of power each individual drive member 27. This assures that clamp segments 7 act simultaneously to connect and disconnect the joint. The remote actuable powered locking device and actuator 41 are similarly interconnected to assure proper functioning of the locking devices 33. If required, a compressible force producing mechanism could be adapted between the clamp segments 7, assuring each gap 36 is closed substantially evenly.

Figure 8A:
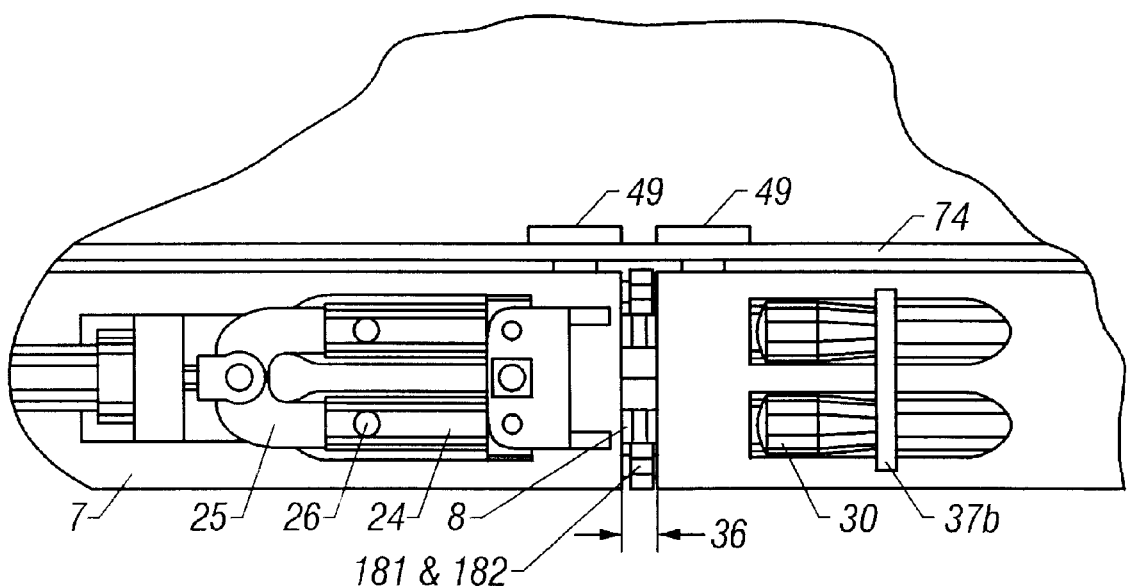
FIG. 8a is a partial side view similar to FIG. 8 illustrating a preferred embodiment of the invention focusing on a gap controller.

Referring to FIG. 8a, to control the amount of preload observed at gasket 9 and to control the similarity of gaps 36, gap controllers 181 limit the minimum gap distance of gaps 36 between the clamp segments 7. In a preferred embodiment of the invention, gap controllers comprise at least one adjustable member 182 disposed on one of the clamp segments 7. The amount of preload applied to gasket 9 is a function of the magnitude of gaps 36 between clamp segments 7. The appropriate amount of gasket load can be applied with gaps 36 free to close, then gap controllers could be adjusted to prevent gaps 36 from becoming smaller. Thus the gasket load will always reach the predetermined maximum magnitude. An alternate motion limiting means 37b is illustrated in FIG. 8a.

Figure 13:
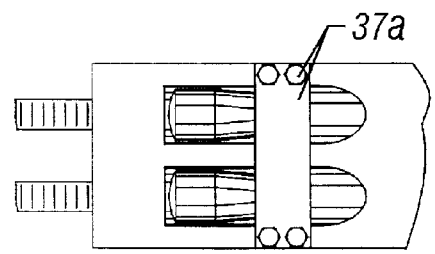
FIG. 13 is a partial side view of an alternative embodiment of the invention that limits the motion of the clamp segment fastener shown in FIG. 12. It is one of many possible means to perform the motion limiting function of device 37.

Referring to FIGS. 9–13, to remote open the clamp segments 7, a signal is sent from a control panel (not shown) removed from the clamp segments 7. The signal activates a remote power supply (not shown) to activate remote actuable powered drive members 27 to stretch the bolts 8 until the locking devices 33 are unloaded and can be retracted by actuating the remote actuable powered locking device actuator 41. In an embodiment, guide members 42 that travel through passageways in anchors 43 predictably guide the motion of the locking devices 33. Once the locking devices 33 are clear of clevis nuts 24, a passageway is formed, allowing clevis nuts 24 to be moved by the remote actuable powered drive member 27 toward reaction shoulders 32. When the remote actuable powered drive member 27 advances the bolts 8 through the passages 23, the gap 35 diminishes. A motion limiting means 37, attached to the bolts 8, makes contact with the clamp segments 7 at a contact surface 34. The motion forces the clamp segments to move apart expanding the parameter of the clamp segments 7 until clevis nuts 24 make contact with the reaction shoulders 32. At the reaction shoulders 32, clevis nuts 24 cannot pass through the passageways 23, limiting the expanding motion of the clamp segments 7 in a self-limiting manner. Thus, due to the limitations on movement of the parts comprising the clamp segment fastener 55, the opening motion of the clamp is self-limited. Therefore, no motion monitoring devices are required. The motion limiting means 37 is adjustably attached to bolts 8. FIG. 13 shows an alternate embodiment of the motion limiting means 37, identified as 37a. The motion limiting means 37a is attached to the clamp segments 7 above the locking nut 30 and performs the same functions as the motion limiting means 37. Furthermore, motion limiting means 37a is designed to allow unimpeded access to a standard wrench interface 40, to allow quick manual tightening of the clamp segment fastener 55.

One skilled in the art would realize that a sensor could be used to indicate whether the clamping apparatus should remain in either the closed and locked position, or alternatively in the open position. This sensor would control and inhibit the state transition of the clamping mechanism when environmental conditions dictate it.

A manual operation controller can also be added to the device to provide a backup mechanism to adjust the stored energy in the clamp segments. To manually open the connector, one only needs to loosen threaded locking nut 30 on the bolts 8 and retract the locking device 33 by common rigging methods, extending bolts 8 until clamp segments 7 are opened.

A portable power supply may be used to move the remote actuable powered drive member 27 and the remote actuable powered locking device actuator 41 to open the connection. The remote actuable powered drive members can utilize any form of power, such as electric, pneumatic, or hydraulic power.

A preferred embodiment of the clamp-type connector utilizing fasteners 55 has clamp segments 7 that radially expand and contract to liberate and secure the flange members 5 and 10. When the clamp segments 7 are tightly fastened they engage the flange members 5 and 10, such that the weight of the clamp segments 7 is supported by the flange members 5 and 10. When the clamp segments 7 are opened the weight of the clamp segments 7 is supported by the springs 48 and the guide pins 44 and 49 attached to the guide pin support frames 45 and 51.

Figure 9:
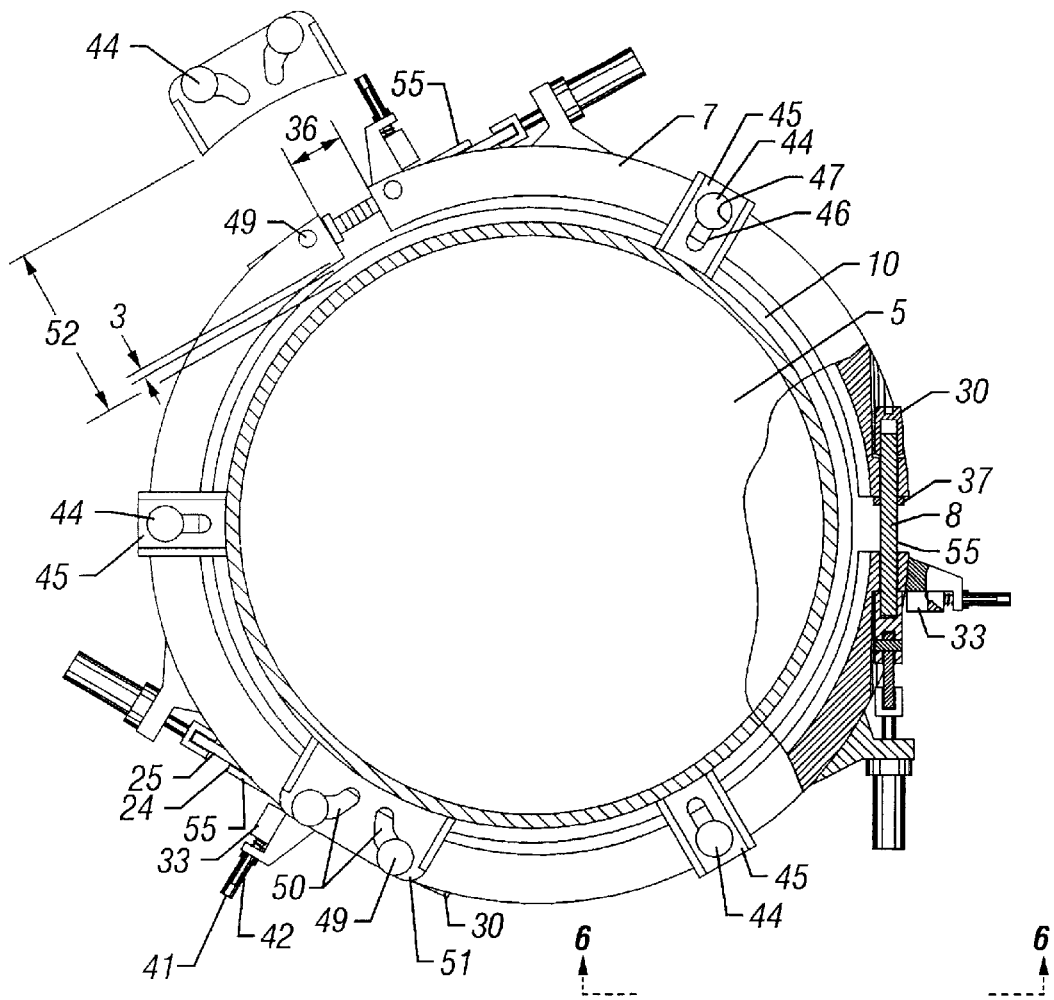
FIG. 9 illustrates the expanded position of a preferred embodiment of the invention shown in FIG. 5.

Referring to FIGS. 1, 5 and 9, in an embodiment, guide pins 44 are located at the midpoint of each clamp segment, preferably evenly spaced from the clamp gaps 36. The guide pin support frames 45 and 51 each include a passageway 46. The guide pins 44 and 49 are attached to clamp segments 7 and are restricted to motion allowed by the passageways 46 and 50 through which the guide pins 44 and 49 travel, thereby predictably controlling the motion of the clamp segments. The guide pins 44 and 49 have shoulders 47 (FIG. 12) that have a diameter larger than the passageways 46 and 50 such that the guide pins 44 and 49 cannot pass fully through the guide pin support frames. Since guide pins 44 and 49 are attached to clamp segments 7 and cannot pass fully through the supports 45 and 51, the length of the guide pins 44 and 49 axially locate the clamp segments 7 a certain prescribed distance away from supports 45 and 51. This distance is maintained by the springs 48. The pins 44 and the passageways 46 in the supports 45 play an important role in aligning the segments of the clamp segments 7 to their first point of contact with the flange members 5 and 10. At the pin locations 44 and 49, the springs 48, confined between the clamp segments 7 and the supports 45 and 51, hold the position of clamp segments 7 such that the internal female tapered section of clamp segments 7 is maintained in a position for alignment of the male flange hubs of the flange members 5 and 10. Thus, the invention provides a self-contained clamp-type connector, which may be operated on any orientation with respect to gravity without modification.

Further, the guide pins 44 and 49, being restricted to travel in passageways 46 and 50, control the movement of the clamp segments 7, both relative to each other and relative to the flange members 5 and 10.

The function of the guide pins 44 and 49, and the supports 45 and 50 could be replaced by guide rods attached to the stationary neck 4 passing through or by the clamp segments 7 or by guide rods attached to the clamp segments 7 and restricted to motion in a slot attached to the neck 4.

Referring to FIG. 14 through FIG. 17c, FIG. 14 illustrates a resilient deflection 60 of one of the clamp segments 7 when a fastener force 58 is applied near the ends of clamp segments 7, farthest away from their midpoint. The conical make-up shoulder 13a is a mechanical advantage wedge that multiplies fastener force 58, generated by fasteners 55, into a resultant clamping force, having an axial and a radial component ("radial force 62"). The clamp segments 7 apply such axial force to forcefully draw coupled flange members 5, 10 or 10a ("flange members") together, in turn, producing gasket compression force on a gasket 9 between them. If not accounted, deflection 60 can lead to non-uniform gasket compression force distribution ("non-uniform force") along the clamp segment-to-flange member contact surfaces ("contact interface") when deflection 60 causes the clamp segments 7 to produce more force on the mating flange members near the end of its segments.

Many gaskets can introduce a stand-off in the flange members; meaning, initially when the flange members come together to seat a gasket, the gasket will resist and tend to hold the flange members apart. When the flange members are forcefully drawn together the initial standoff reduces as the gasket becomes seated.

In a clamp-type connector embodiment of the invention, the clamp segments 7 are adapted to make controlled contact ("CC clamp segments") at or about the midpoint of the clamp segment farthest away from the clamp segment fasteners. These clamp segments 7 can be predisposed by forming or over-sizing to account for deflection 60. Forming is achieved by intentionally and plastically pre-deflecting the clamp segments 7 and over-sizing is describe herein.

CC clamp segments tend to separate from flange members at gaps 36 when un-energized by clamp segment fastener 55. Clamp segment fastener 55 forcibly and elastically flexes CC clamp segment 7 into engagement with the flange members (FIG. 14). With CC clamp segments 7, the gaps 3, as shown in FIG. 9, quickly become significant at the ends of each clamp segment 7 when clamp segments 7 are opened as fastener 55 is loosened. When clamp segments 7 are loosened, the end segments of the clamp segments 7 initially flex radially outward, away from the flange members. This causes gaps 3 to quickly become pronounced. This motion significantly reduces the distance the clamp segments 7 are required to move away from flange members, as can be measured by the required length of the passageways 46.

Compared to the mating of exact-sized clamp segments to flange members, CC clamp segments substantially reduce the distance the clamp segments 7 must move to open. Also, the initial contact area between the clamp segments 7 and flange members 5 and 10 is significantly greater than in the corresponding prior art mating components. Smaller open position gaps 36 result in cost saving because the components of the clamp segment fastener 55 can be much shorter. The open perimeter of the clamp segments 7 is much smaller, saving space. Also frictional forces holding the clamp segments 7 onto the flange members are partially overcome by the outwardly flexing action of the CC clamp segments 7 away from the flange members when initially opened.

In a clamp-type connector embodiment of the invention, clamp segments 7 are further adapted to maximize initial area contact between the flange members and the clamp segments 7. In this embodiment, CC clamp segments 7 connecting to the flange members eliminate wear at the contact surfaces 13. When the CC clamp segments 7 are moved on and off the flange members, the contact stress on the surfaces 13 is significantly lowered because the contact area between the clamp segments 7 and flange members is greatly increased.

Because the CC clamp segments 7 are resiliently flexed into engagement to close onto flange members, there exists a gap closing resistance force at gaps 36. This assures the remote actuable powered drive members 27 associated with the clamp segment fasteners 55 will move the clamp segments 7 substantially simultaneously and that a uniform closing resistance at the gaps between the segments is present.

Another clamp-type connector embodiment describes a device that is adapted to apply force to flange members to retain them. It has a channel shaped clamp segment 7 to mate to a flange member interface. It could also be applied without flange members. That is, the clamp segments may not have a channel shape. For example, it could be used to safely apply a substantially encompassing force to the outside of a substantially smooth pipe to seal a leaking hole in the pipe.

The components comprising the clamp-type connector embodiments can be adapted to an optimized geometry and construction to produce the maximum strength to weight ratios. For example, the body of the clamp segments 7 could have locally reduced or removed sections. These locally reduced sections could also be designed to improve the flexibility of the clamp segments 7.

Figure 15:
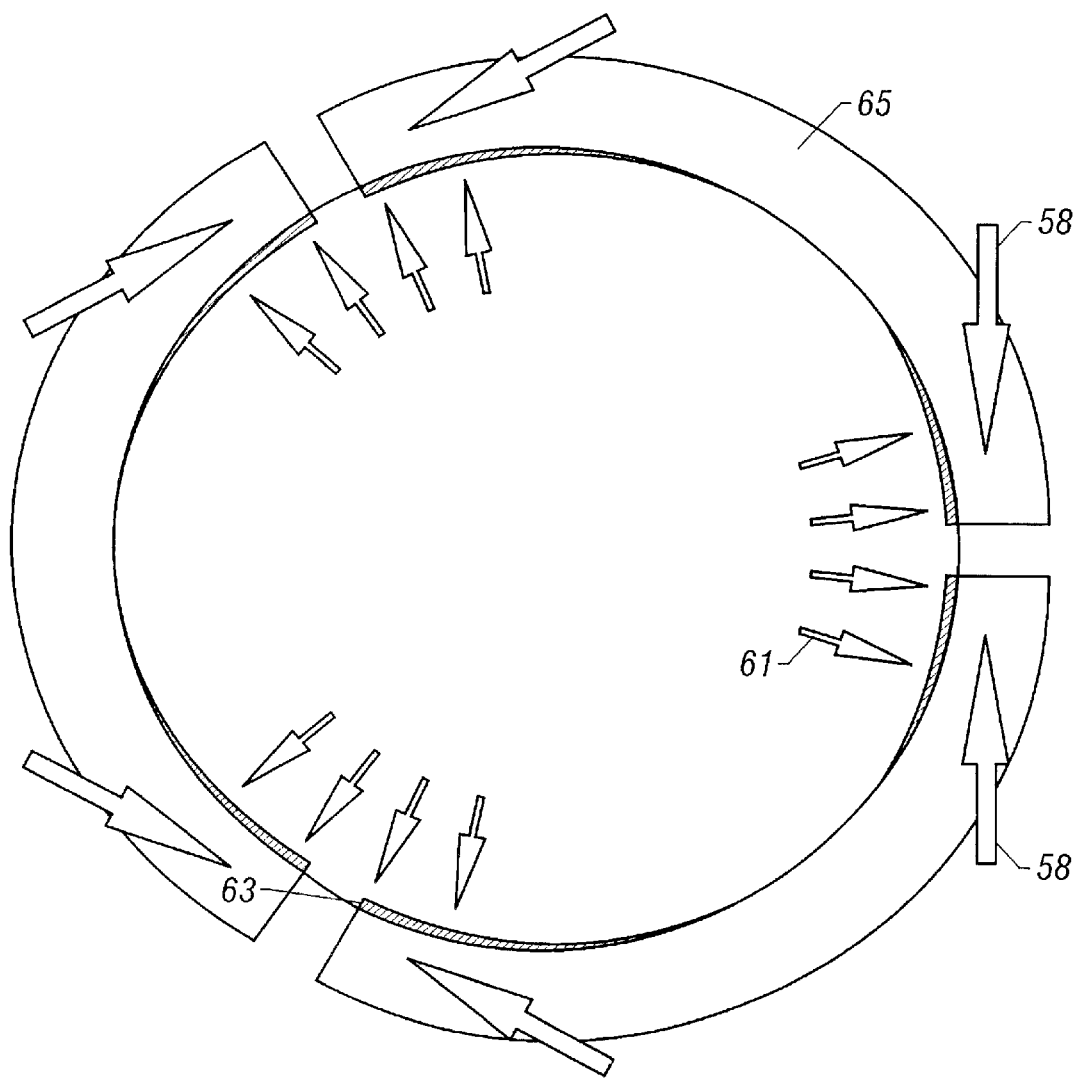
FIG. 15 is a top plan view of the flange-sized clamp segments. It diagrams the relationship between the applied fastener force to the reaction force of the flange members with respect to applied clamp segment force. It also substantially illustrates an initial contact surface, mating arrangement between the clamp segment and flange members.

FIG. 15 illustrates an undesirable initial contact position where initial stand-off of the coupled flanges causes exact-sized clamp segments 65 to in turn significantly stand-off from their final closed and secured position. The initial contact interface 63 produced when a clamp segments' 65 midpoint of its contact interface is intentional produced in a manner such that equals the midpoint of the contact interface of its coupled flange members ("exact-sized"). Exact-sized clamp segments 65 have a small initial contact interface and therefore are susceptible to contact interface damage. When stand-off increases initial contact interface 63 decreases but the force required to seat the gasket doesn't changed;

therefore, this force is applied to a smaller area creating higher contact interface stress resulting in an increase potential for surface damage. When standoff increases a larger amount a sliding occurs at the contact interface so wear becomes a problem. In a closed and locked position deflection 60 is not accounted. Because of this, exact-sized clamp segments 65 may produce non-uniform force rendering its final closed and locked position undesirable. Exact-sized clamp segments are therefore less desirable.

Figure 16:
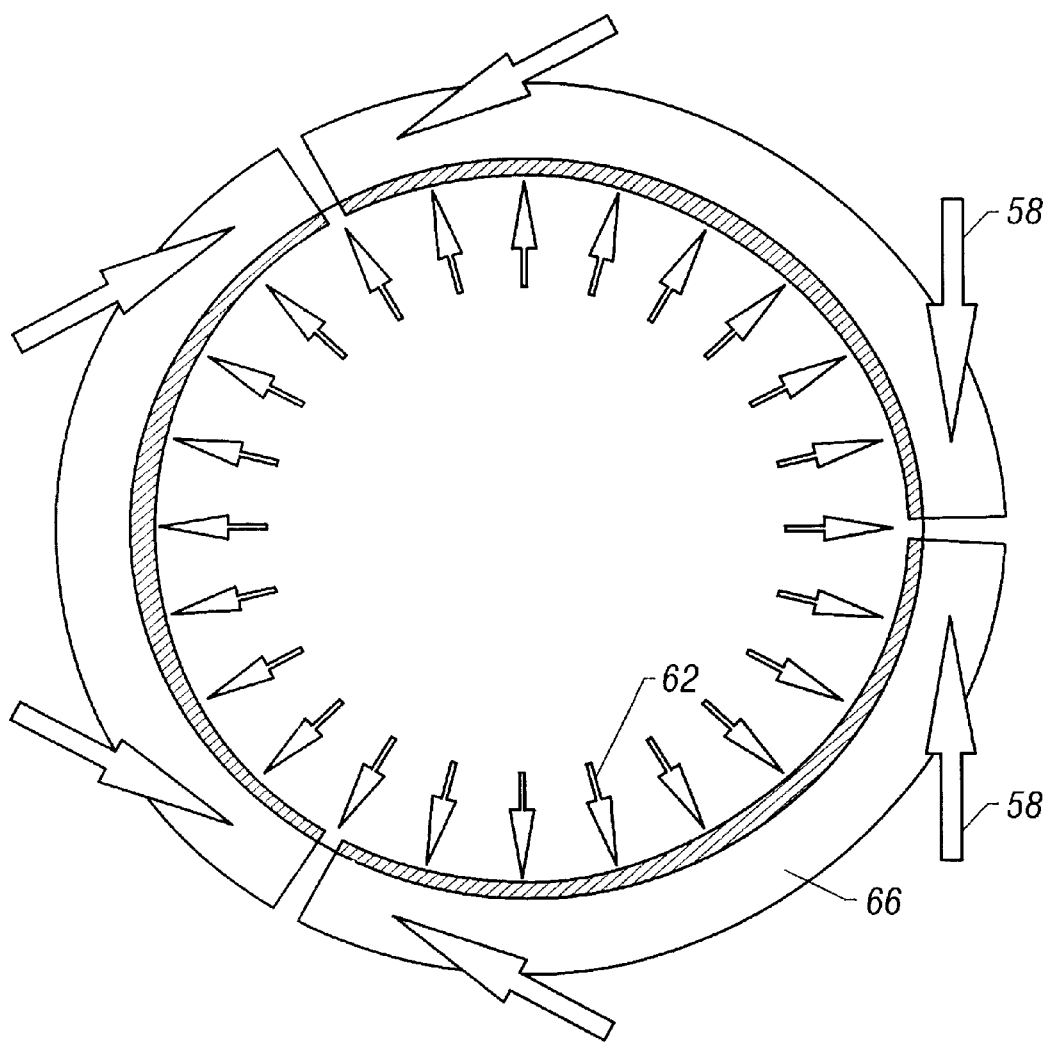
FIG. 16 is a top plan view of the oversized clamp segments. It diagrams the relationship between the applied fastener force to the reaction force of the flange members with respect to applied clamp segment force. It also substantially illustrates an initial contact surface, mating arrangement between the clamp segment and flange members.
Figure 17C:
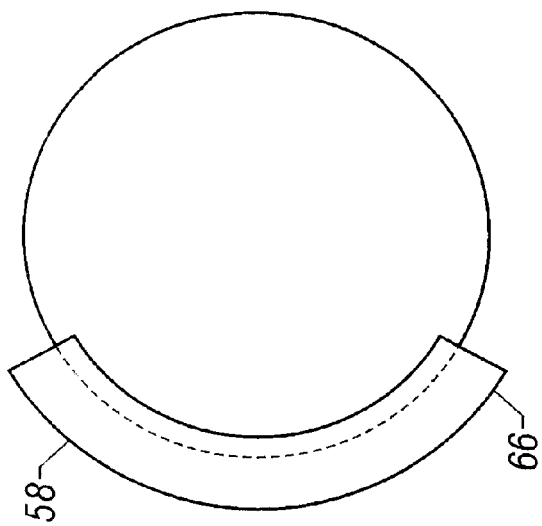
FIG. 17c is a top plan view of the oversized clamp segment of FIG. 17b illustrating it relative to a flange member it is mating. The circle represents the midpoint of the clamp segment-to-flange member contact surface on the flange member. It shows the oversized clamp segment in its final contact position with the flange member.

Referring to FIG. 16 through FIG. 17c, FIG. 16 illustrates an clamp-type embodiment of the invention having a desirable initial contact position where the initial stand-off of the coupled flanges and deflection 60 are effectively addressed. This desirable clamp-type connector embodiment comprises intentionally oversized clamp segments' 66, wherein the midpoints of their contact interfaces are intentionally produced in a manner such that they are larger than the midpoints of the contact interfaces of their coupled flange members ("oversized"). Oversized clamp segments 66 have a large initial contact interfaces and, therefore, are able to negate contact interface damage. Succinctly, oversized clamp segments 66 are clamp segments 7 in an oversized state. Oversized clamp segments 66 handle standoff effectively because the initial contact interfaces 64 have large area contacts so the clamping force is applied to a larger area resulting in low contact interface stress, effectively negating surface damage concerns. Wear is negated because the initial contact positions of oversized clamp segments 66 are substantially closer to their final, closed, and locked positions, as compared to exact-sized clamp segments 65; therefore, very negligible sliding occurs at the contact interfaces. In a closed and locked position, deflection 60 is accounted. Oversized clamp members 66 deflect into substantially uniform contact along the contact interfaces, producing substantially uniform gasket compression force distribution. One skilled in the art need only calculate the deflection 60 and oversize clamp segments 66 accordingly.

Figure 17B:
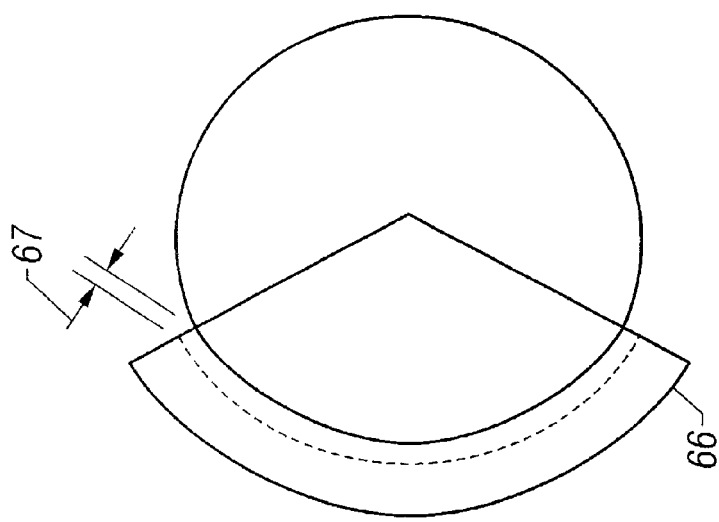
FIG. 17b is a top plan view of the oversized clamp segment of FIG. 17a illustrating it relative to a flange member. The circle represents the midpoint of the clamp segment-to-flange member contact surface on the flange member. It shows an exaggerated oversized clamp segment and its initial contact with the flange member.
Figure 17A:
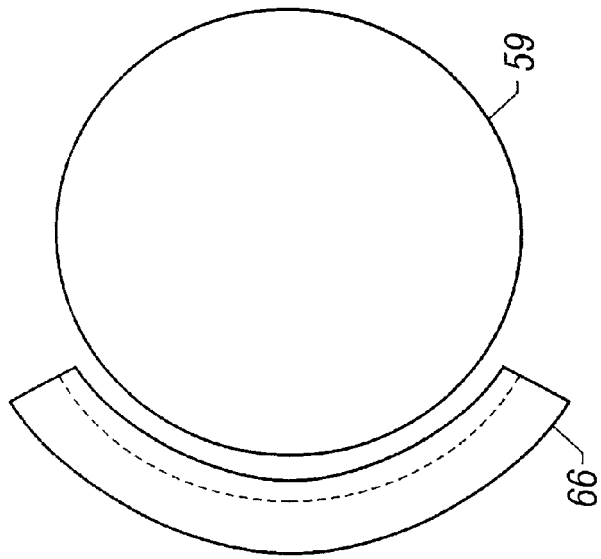
FIG. 17a is a top plan view of a construction configuration of a oversized clamp segment illustrating it relative to flange member it will mate. The circle represents the midpoint of the clamp segment-to-flange member contact surface on the flange member.

FIG. 17a shows one of the oversized clamp segments 66. In a cylindrical embodiment, it is preferable to machine a ring oversized and then separate it into oversized clamp segments 66. The midpoint of contact interface 59 is illustrated as a circle.

FIG. 17b shows the oversized clamp segment of FIG. 17a in its initial contact position, wherein the midpoint of the oversized clamp segment is tangent to the contact interface 59. Notice the exaggerated relief 77 due to oversized.

FIG. 17c shows the oversized clamp segment of FIG. 17b in its final, closed, and secured contact position, wherein deflection 60 reduced relief 77 resulting in uniform contact interface 59 between oversized clamp segments 66 and coupled flange members.

Figure 18:
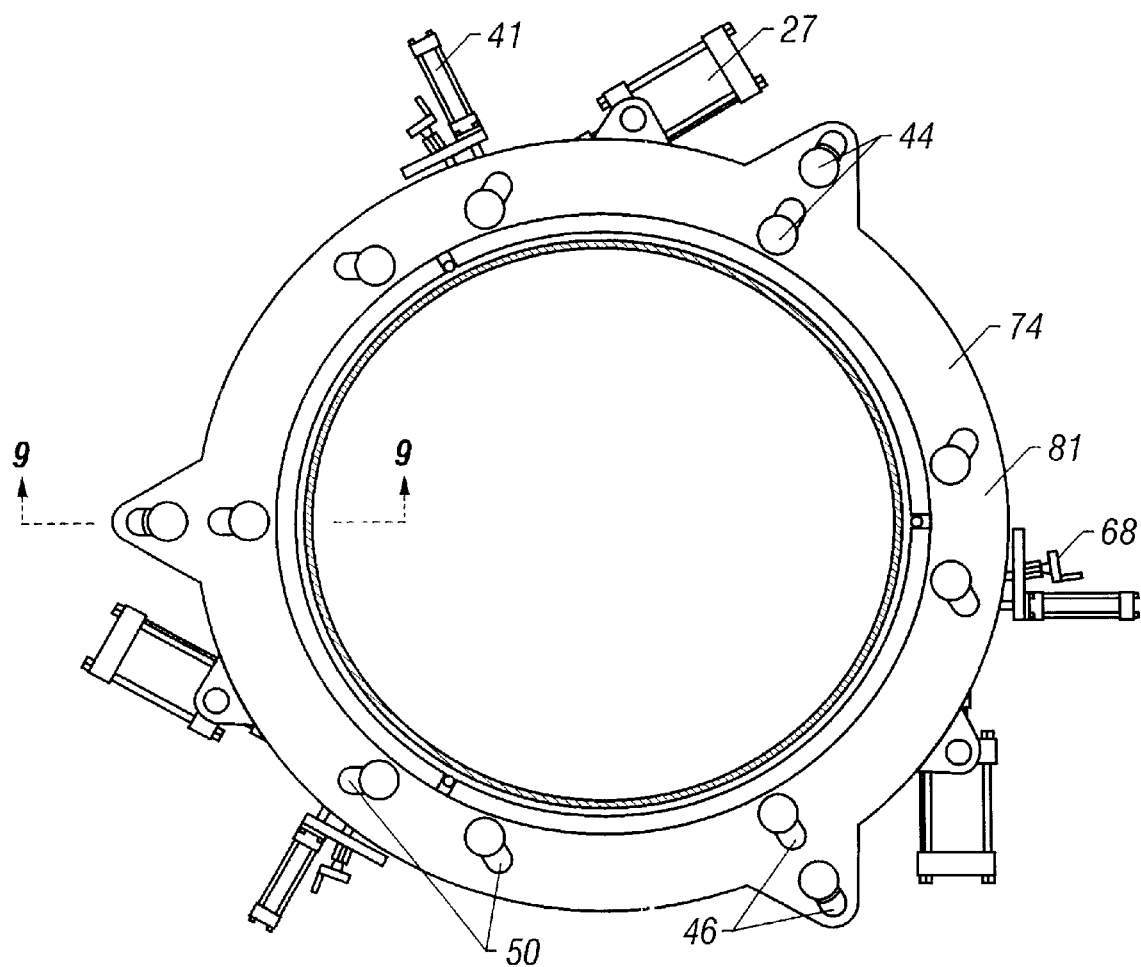
FIG. 18 is a top plan view of the closed position of a preferred clamp-type connector embodiment of the invention, similar to FIG. 5.

FIG. 18 is similar to FIG. 5 and shows the clamp-type connector embodiment of the invention. FIG. 18 illustrates a preferred continuous support plate 75 containing the passageways 50 and 46. FIG. 18 shows another preferred embodiment of the fasteners 55 having a manual safety interlock 68 to prevent inadvertent remote operation. The guide passageways 46 and 50 may be part of a support plate 74 rather than in separate support frames 45 and 51. Support plate 74 is then mounted to one of the flange members 5 or 10 as discussed herein.

Figure 19:
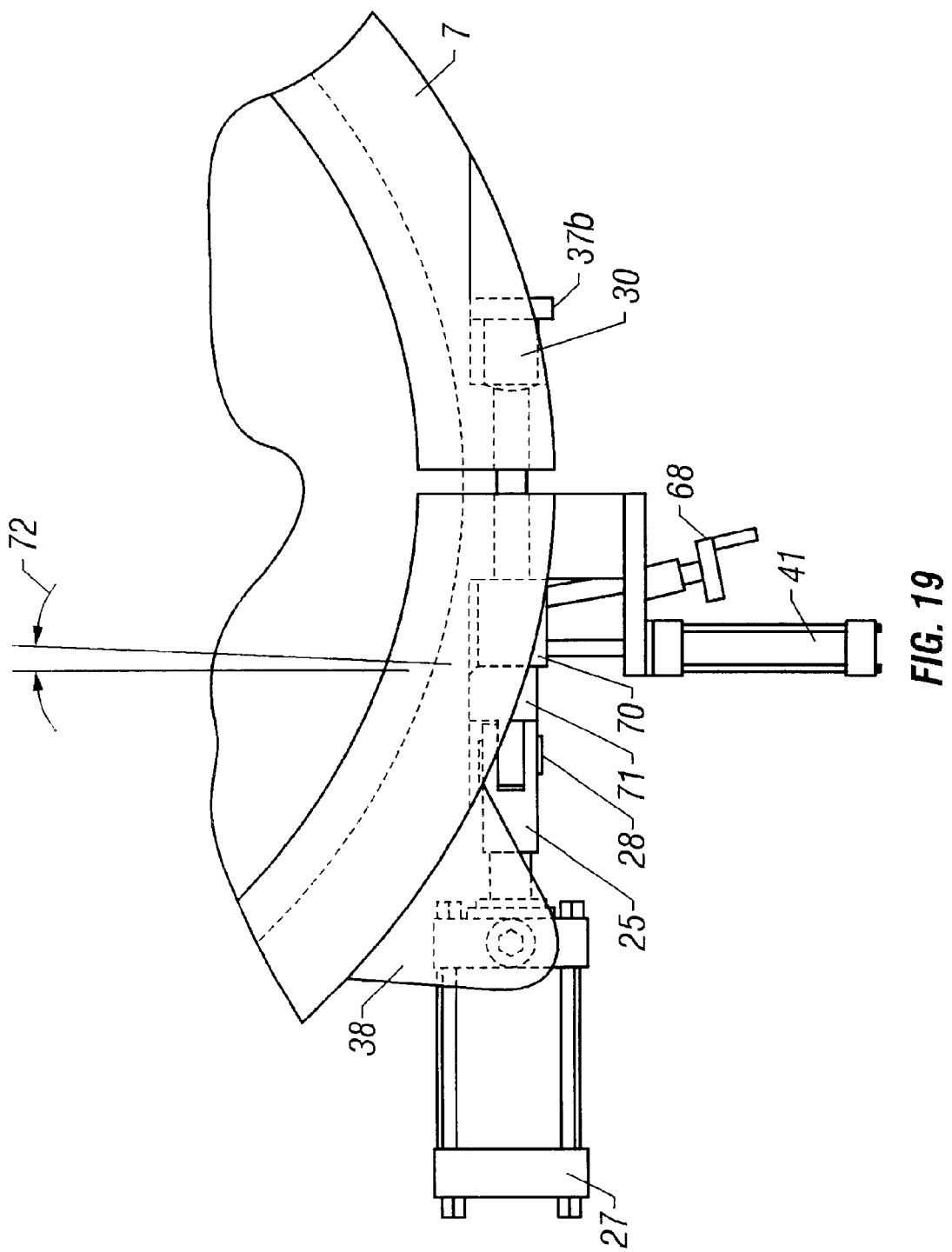
FIG. 19 is partial top plan view of the invention tightening or securing a structural unit such as a clamp-type connector. Specifically, it shows the closed position of the clamp-type connector embodiment of the invention in FIG. 18.

The clamp segments 7, the clamp segment fasteners 55, the remote actuable powered drive members 27, the locking devices 33, and the remote actuable powered locking devices actuators 41 could all be functionally assembled in a self-contained portable assembly 81 (FIG. 23), which could then be mounted or attached to flange members 5, 10, or 10a. FIG. 19 illustrates a preferred embodiment of the fastener 55. FIG. 19 is similar to FIG. 7 and is further adapted for remote tightening, utilizing a forgiving wedged locking device 70 that can advance to easily adjust for varying magnitudes of stand-off and applied force. Locking device 70 interacts with wedged clevis nut 71 and is adjustably fixed to one of the structural units being fastened. Manual interlock 68 holds locking device 70 in a locked position preventing remote operation when it is engaged against locking device 70. As an alternate safety feature, remote actuable drive member 41 can be a spring-extend hydraulic cylinder such that when the remote actuable drive member 41 is un-powered, spring force tends to force locking device 70 its locked position. The wedge angle 72 will be preferably small so as to be self-locking due to friction contact. Those skilled in the art can easily derive wedge angle 72.

Figure 20:
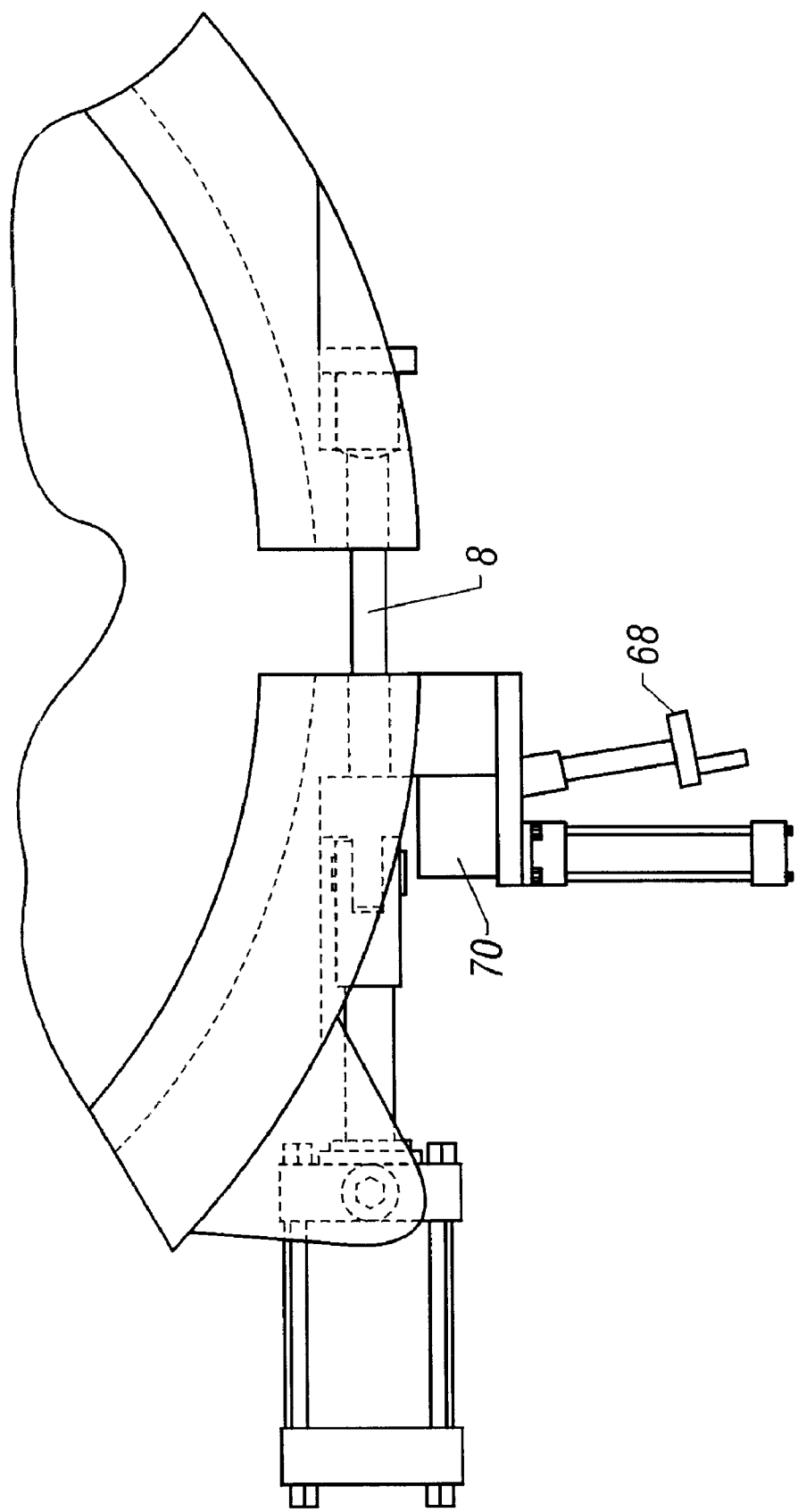
FIG. 20 is partial top plan view similar to FIG. 19 of the invention in an open position. Specifically, it shows the open position of the clamp-type connector embodiment of the invention in FIG. 18 with the support plate removed for clarity.

FIG. 20 shows how the fastener 55 in FIG. 19 disengages. First, manual interlock 68 is disengaged. Then the worker can leave the area and remote operate the opening of the fastener 55 by activating the remote actuable drive members 27 and 41.

Figure 21:
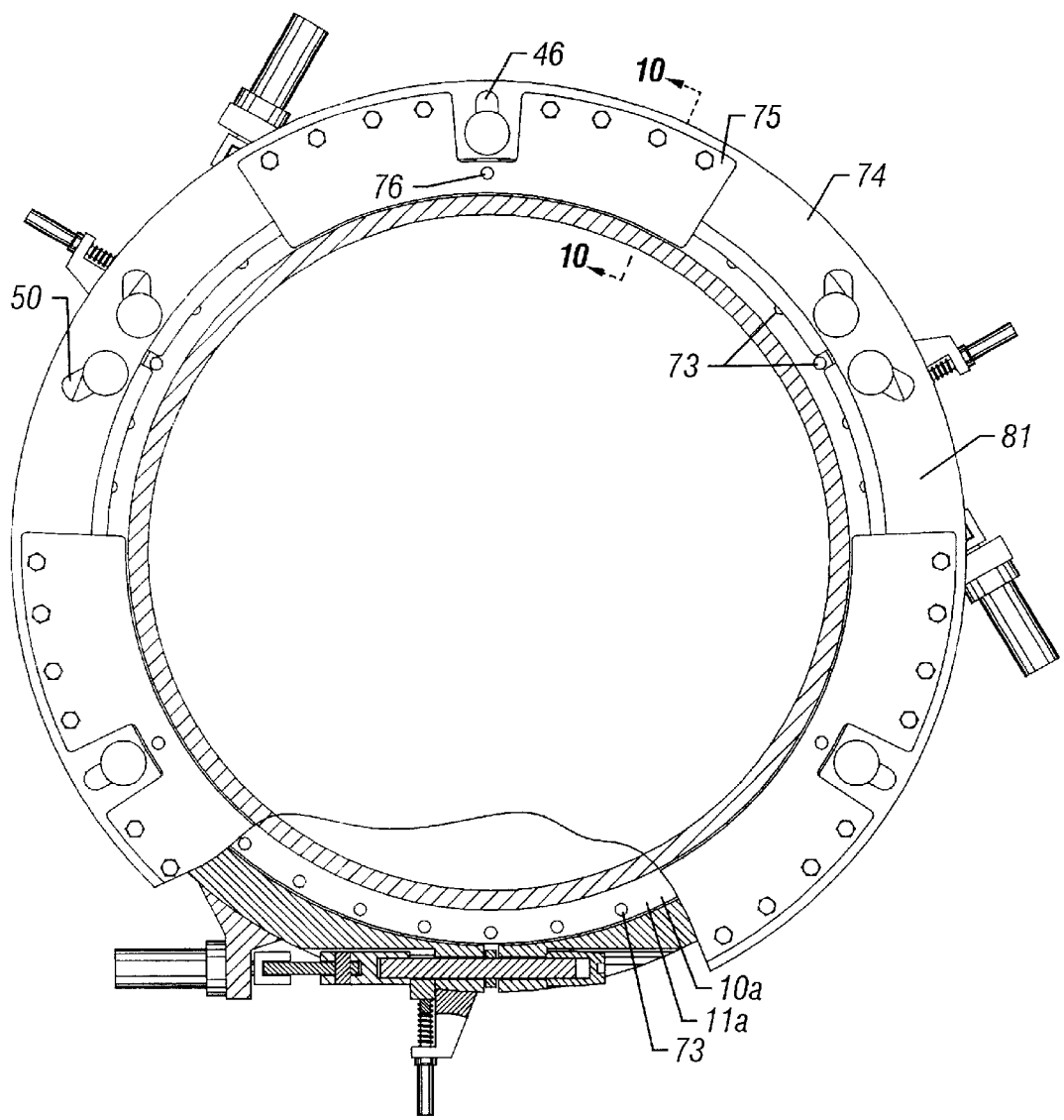
FIG. 21 is a section view of a mounting attachment to retrofit a standard multiple-bolt flange
Figure 22:
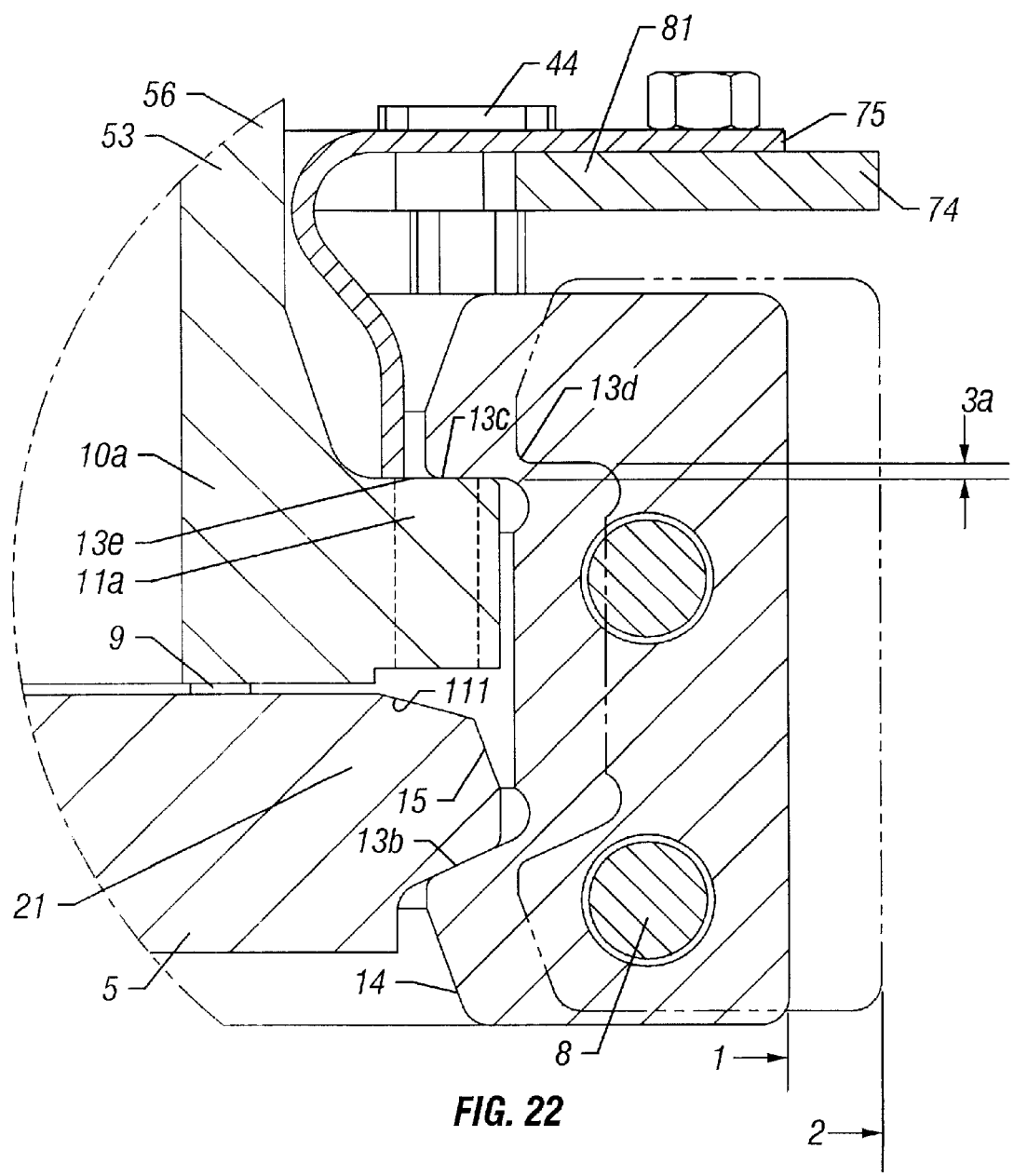
FIG. 22 is an exploded partial section view as seen along line 10—10. It is a mounting attachment to retrofit a standard multiple-bolt flange.

Referring to FIG. 21 and FIG. 22, in the clamp-type connector embodiment, the apparatus in these figures is substantially similar to the apparatus in FIG. 5. FIG. 22 is an illustration of how an embodiment is adapted to a manually bolted flange member 10a. This embodiment is adapted to the flange member 10a without the attachment of supports 45 or 51 to vessel 82. The abandoned bolts holes 73 of the manually bolted flange member 10a are evident. In this embodiment, the passageways 46 and 50 are adapted to a support plate 74 that, in this embodiment, is a continuous ring.

Spring members 75 interface flange member 10a and support plate 74 and produce a clearance 3a by springing the clamp segments 7 vertically upward away from the flange member 10a, assuring reliable positioning of clamp segments 7 relative to flange member 10a. This further assures predictable, remote operable operation between the open position and the closed position of the clamp segments 7.

Attachment 76 interfaces flange member 10a and spring members 75 to fix the placement of the spring members 75 to the flange member 10a. This embodiment can be installed between Delayed Coking cycles, presenting very significant cost savings to coke drum owners.

Spillway 77 and make-up shoulder 13b on the clamp segment 7 facilitate removal of material from the vessel and create a self-cleaning engagement between all configurations of flange members and the various configurations of the clamp segments 7 when this area is flushed as the seal 9 is broken.

Figure 23:
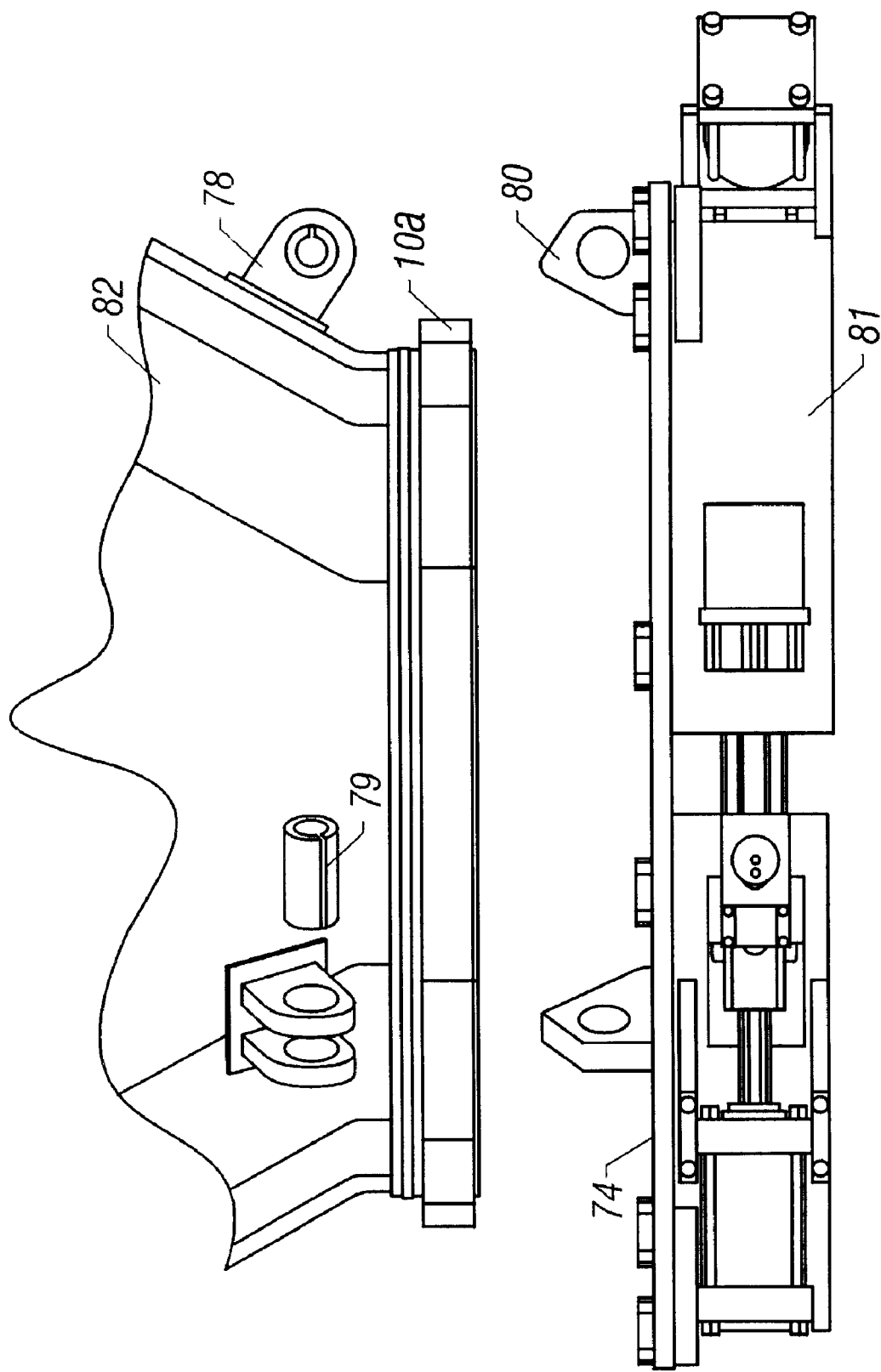
FIG. 23 is an elevation view of an alternate mounting attachment to retrofit a standard multiple-bolt flange.

Referring to FIG. 23, in the clamp-type connector embodiment, the apparatus in these figures is substantially similar to the apparatus in FIG. 5. FIG. 23 is an illustration of how an embodiment is adapted to a manually bolted flange member 10a. This embodiment is adapted to the flange member 10ausing lugs 78, pins 79 and lugs 80. Lugs 80 attach to assembly 81 at the support plate 74. The entire assembly 81 is portable so this embodiment can be installed between Delayed Coking cycles, presenting very significant cost savings to coke drum owners.

Figure 24:
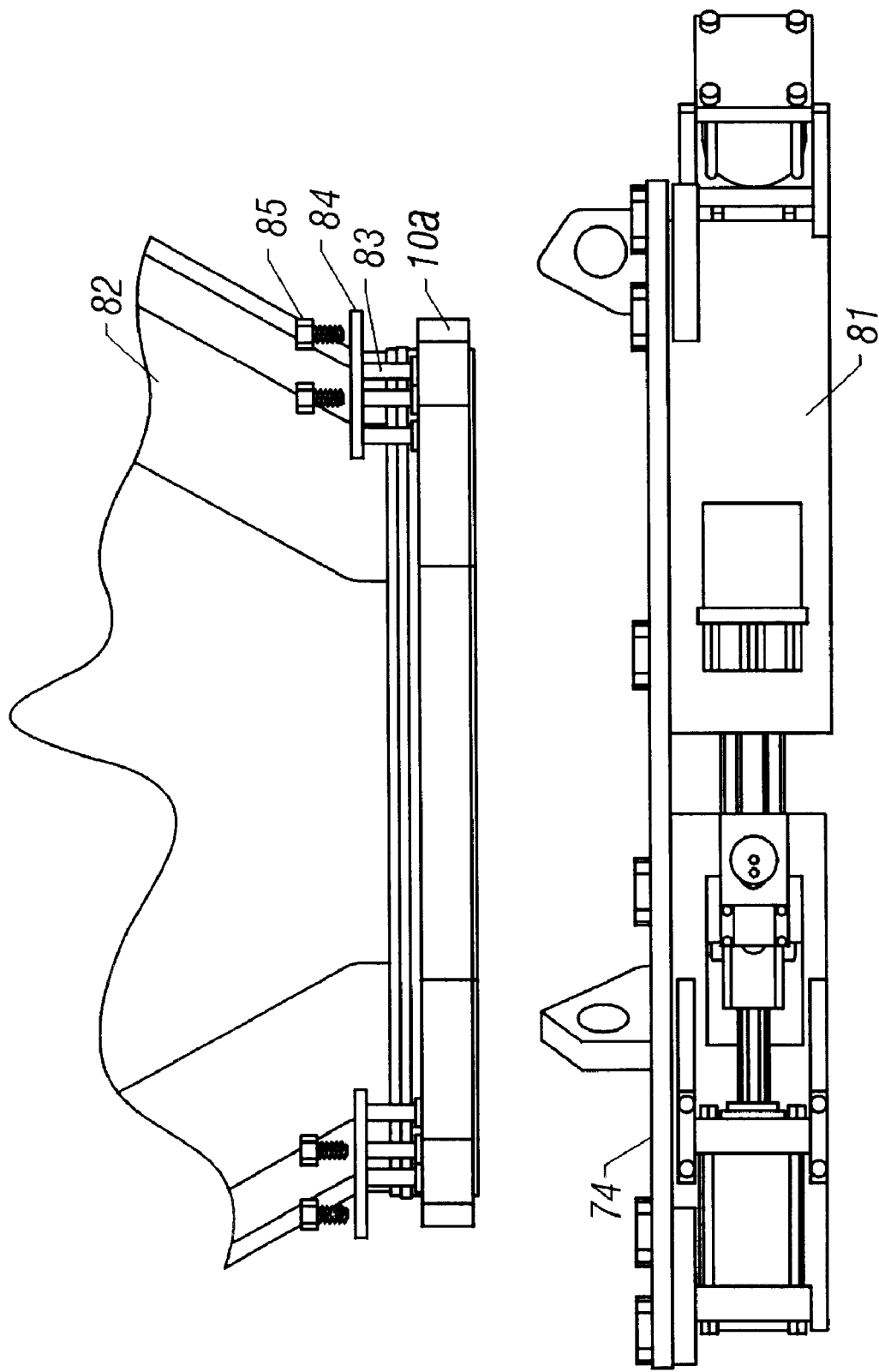
FIG. 24 is an elevation view of an alternate mounting attachment to retrofit a standard multiple-bolt flange.

Referring to FIG. 24, in the clamp-type connector embodiment, the apparatus in these figures is substantially similar to the apparatus in FIG. 5. FIG. 24 is an illustration of how an embodiment is adapted to a manually bolted flange member 10*a* without fabrication to vessel 82. This embodiment is adapted to the flange member 10*a* without the attachment of lugs 78 to vessel 82. Abandoned bolts holes 73 anchor pins 83 that are attached to lugs 83 creating an attachment for assembly 81. Fasteners 85 dispose assembly 81 on flange member 10*a* by fastening lugs 83 to support plate 74.

Figure 25:
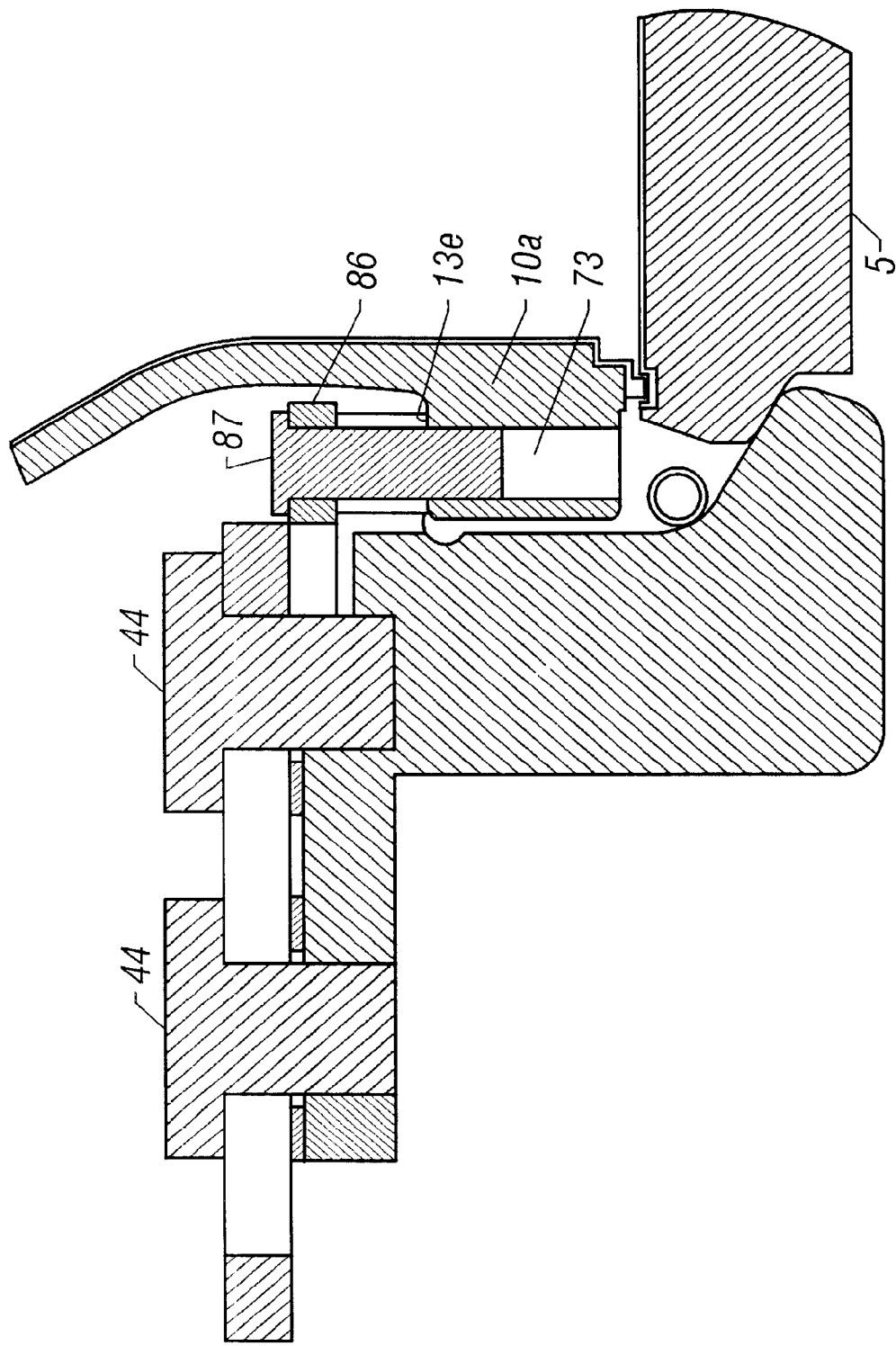
FIG. 25 is an exploded partial section view as seen along line 9—9. It is a preferred mounting attachment to retrofit a standard multiple-bolt flange.

Referring to FIG. 25, in the clamp-type connector embodiment, the apparatus in these figures is substantially similar to the apparatus in FIG. 5. FIG. 25 is an illustration of how an embodiment is adapted to a manually bolted flange member 10*a* without fabrication to vessel 82. This embodiment is adapted to the flange member 10*a* by lugs 86 and pins 87. Abandoned bolts holes 73 anchor pins 87 are attached to lugs 86, creating an attachment for assembly 81. Lugs 86 retract inwardly, toward guide pins 44 to allow assembly 81 to address flange member 10*a* from below. Once assembly 81 is raised sufficiently, lugs 86 extend outwardly to engage make-up shoulder 13*e* disposed on flange member 10*a*. Then pins 87 interface lugs 86 and flange member 10*a*, thereby disposing assembly on flange member 10*a*. Advantageously, this embodiment can be installed between Delayed Coking cycles, presenting very significant cost savings to coke drum owners.

Figure 26:
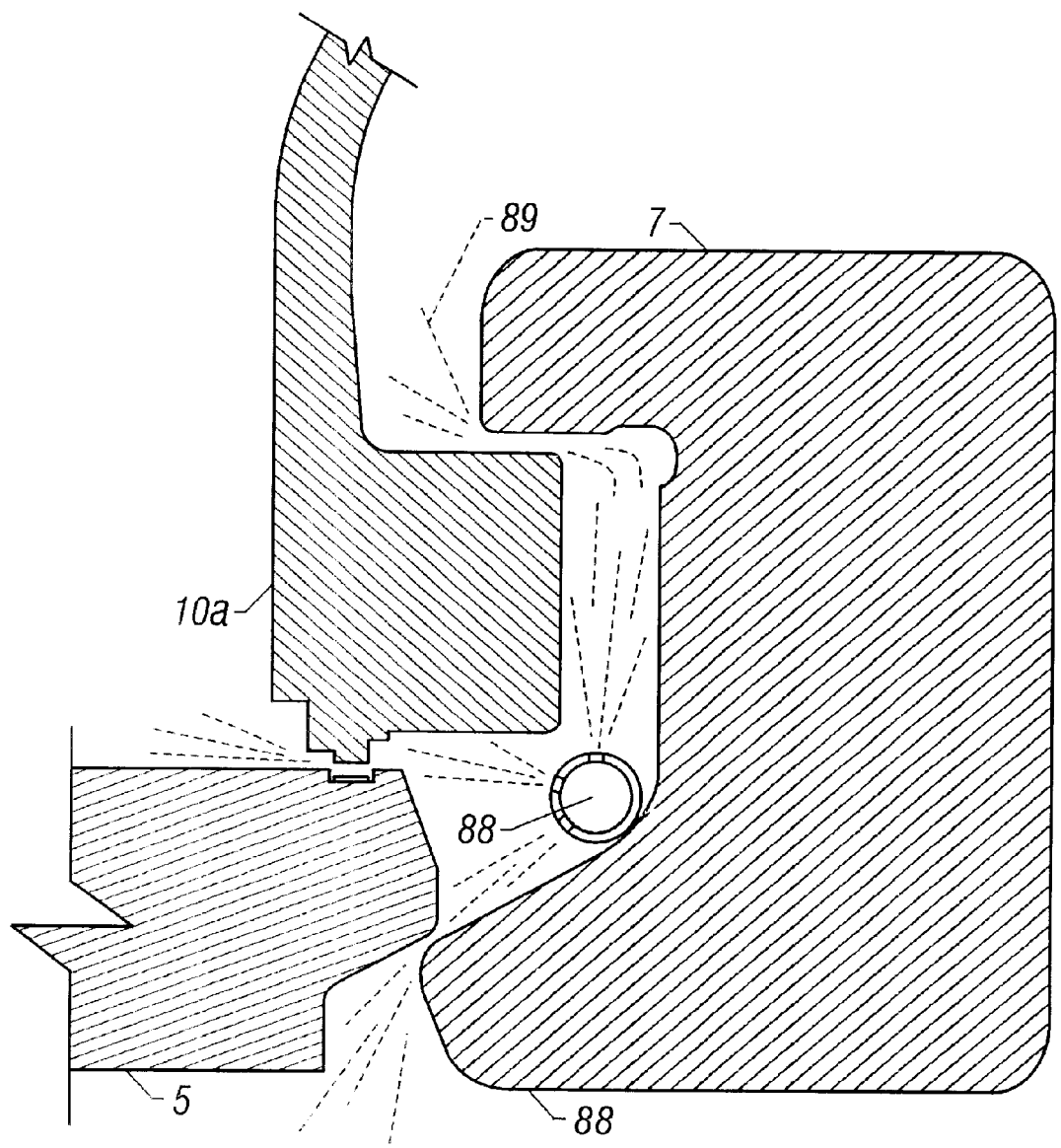
FIG. 26 is a partial section view similar to FIG. 4a illustrating a cleaning mechanism.

Referring to FIG. 26, illustrated is a cleaning mechanism and cleaning method useful in the clamp-type connector embodiment. A cleaning substance, like steam, is introduced in conduit 88 that can be specifically perforated for an intended purpose. The cleaning substance can be pressurized to generate a spray 89 that can cleanse all contact interfaces including gasket 9's interface with the flange members. The conduit 88 can be adapted between the inside of clamp segments 7 and the outside of the flange members. It can be segmented similarly to clamp segments 7.

Figure 27:
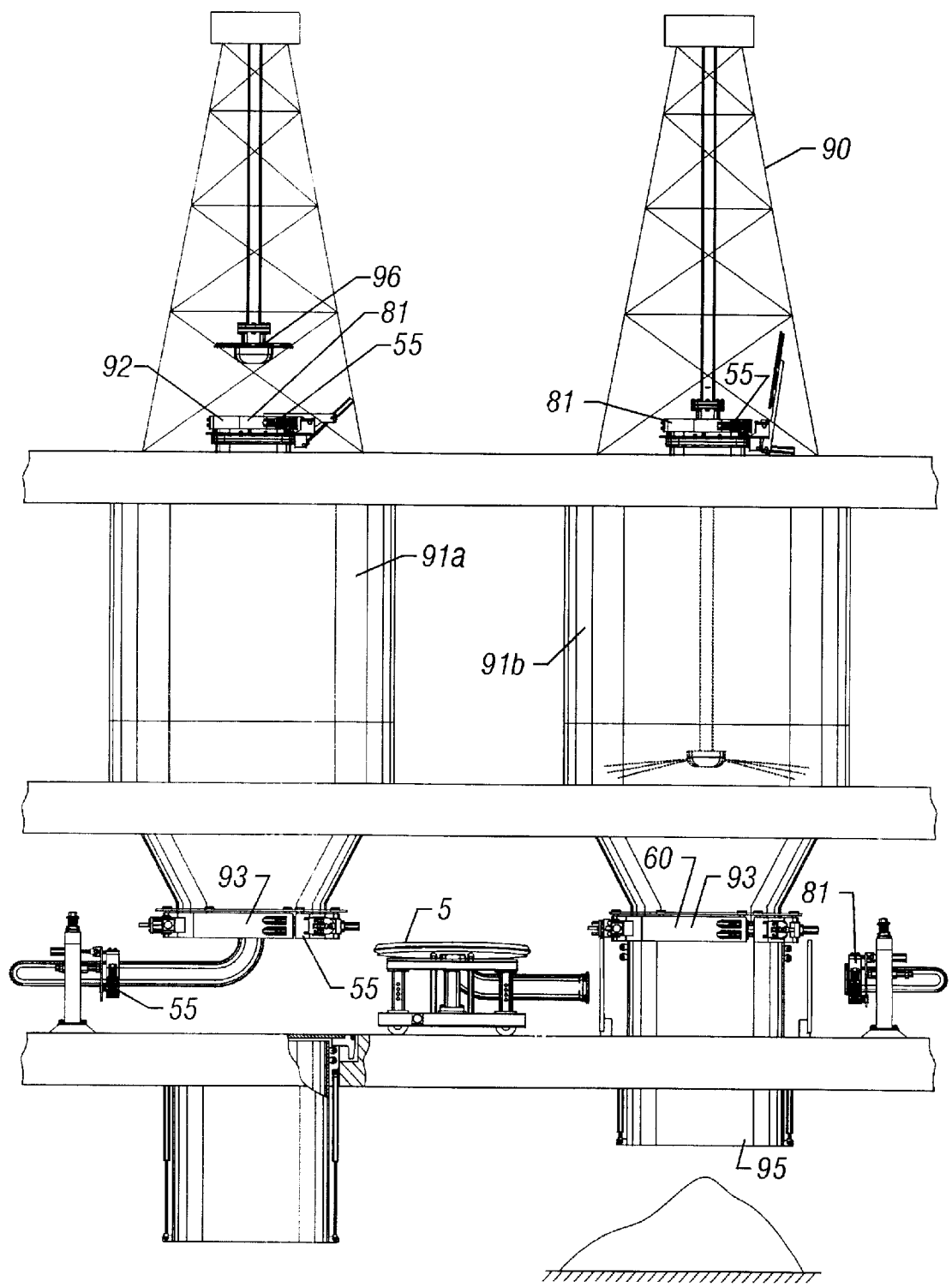
FIG. 27 is an elevation view of a Delayed Coker using fasteners 55, illustrating an automated coke drum with a drill rig atop, an automated drum-top deheading system, an automated inlet pipe connecting system, an automated decoke chute and opening cover and an automated drum-bottom deheading system with a closure mover.

Referring to FIG. 27, a preferred method of using at least one fastener 55 is shown. The vessel structure of a Delayed Coking unit is illustrated having drilling rigs 90 shown above vessels 91*a* and 91*b*. The invention and its clamp-type embodiment are useful for remote connecting and disconnecting joints at drum-top connector 92 drum-bottom connector 93 and a feed line connector 94. It can also attach a decoke chute 95 and drill stem centralizer 96 to vessels 91*a* and 91*b*.

Assemblies 81 are quickly disposed on vessels 56*a* and 56*b* with any one of the devices show in FIG. 21 through FIG. 25 depending on particular circumstances regarding the construction of each Delayed Coking Unit. In coking units vessel 56*a* is generally twenty-four feet in diameter and one hundred feet high. A worker with an impact wrench manually opening clamp-type connector 62 or 63 stands a good chance of being injured by the scalding water in the vessel or by fact that the self supporting nature of coke in the open "bottleneck" disposed at the bottom of vessel 56*a* could be compromised.

Safely decoking a vessel 56*a* or 56*b* involves: (1) opening and/or removing opening cover 60 which covers hole 112, serving as a coke 64 passageway through working surface 107, thereby creating an opening in working surface 107 for coke 64 to pass; (2) remotely aligning and engaging a closure mover to flange member 5, i.e. 61 or 113; (3) remotely energizing flange member 5 to the vessel with closure mover 61 or 113, or by some other method, (4) remotely unlocking and opening clamp-type connector 63, thereby disconnecting and separating the joint between inlet pipe 57 and clamp-type connector pipe 58; (5) remotely unlocking and opening clamp-type connector 62, thereby disconnecting the joint between flange member 5 and the vessel; (6) remotely disengaging the flange member 5 from the vessel in a controlled manner; (7) remotely removing flange member 5 from the opening in the bottom of the vessel; (8) securing a passageway between the opening in the bottom of the vessel and hole 112 in working surface 107; i.e. exit chute 59; (9) remotely unlocking and opening clamp-type connector 88 and removing flange member 91 away from the opening in the top of the vessel; (10) lowering drill bit 103 into the vessel through the opening in the top of the vessel; and (11) engaging drilling head 104 to clamp-type connector 88, then remotely closing and locking clamp-type connector 88, thus securing drilling head 104 or centralizing flange 178 to the vessel.

The foregoing functions prior to opening clamp-type connector 62 or 63 could be performed locally, but for safety, any of the functions after either clamp-type connector 62 or 63 is open and until all coke 64 is removed from vessel 56*a* should be remotely performed.

Once all of coke 64 is removed from vessel 56*a* or 56*b* they can be safely prepared for their return to the coking phase by: (1) removing drill bit 103 from the vessel and replacing flange member 91 to the vessel; (2) closing and locking clamp-type connector 88, thereby locking flange member 91 to the vessel; (3) remotely decommissioning exit chute 59 or 59*a* and replacing opening cover 60, thereby covering hole 112 in working surface 107; (4) replacing flange member 5 and aligning it to cover the hole in the bottom of the vessel and locking it to vessel 56*a* by closing and locking clamp-type connector 62; and (5) remotely aligning flange members 77 and 78 by activating actuator 85 and locking them together by closing and locking clamp-type connector 63. Once a vessel has been cooled and decoked, it poses much less of a hazard to workers. These five steps could be performed locally, however remote operable equipment, such as clamp-type connectors 62, 63 and 88 will be helpful in reducing incident rates of injuries. All steps in preparing a vessel for coking or decoking are detailed more fully in this specification.

FIG. 28 illustrates a preferred embodiment of cleaning, using a steam purge 183. Conduit 172 can transfer a cleaning substance such as steam to internal ports 184 in barrier 173. Internal ports 184 release this cleaning substance about contact surfaces between clamp segments 7 and flange members 5 and 10, or 10*a*, and between the contact surfaces between gasket 9 and flange members 5 and 10, or 10*a*. External ports 185 lead to the areas where segment fastening device 55 interact clamp segments 7 such that the contact surfaces between segment fastening device 55=s elements and clamp segments 7 can be cleansed. Internal ports 184 and external ports 185 will be designed for variable and specific magnitude and direction spraying functions. External ports 185 are rotated from true position.

The aforementioned embodiments can be adapted to be remote operable. They will also be adapted for manual operation is case of failure of remote operation.

Having described the invention above, various modifications of the techniques, procedures, material and equipment will be apparent to those in the art. It is intended that all such variations within the scope and spirit of the appended claims be embraced thereby.

I claim:

1. A remote operable fastener, wherein the fastener is capable of being incorporated into a remote operable clamp connector having clamp segments, including a first clamp segment and a second clamp segment, each clamp segment having at least two ends, and each clamp connector having at least one gap formed between one end of the first clamp segment end and one end of the second clamp segment end, the fastener comprising:

a plurality of force reacting or force producing elements capable of maintaining the gap, such that the failure of any one of force reacting or force producing element does not increase the gap.

2. The fastener of claim 1 wherein the fastener is remote operable without rotating a threaded element.

3. The fastener of claim 1 wherein each clamp segment is capable of deflecting.

4. The fastener of claim 3 wherein each fastener is capable of producing a substantially uniform clamping force.

5. The fastener of claim 3 wherein each fastener is capable of providing a substantially uniform clamping force capable of seating a stainless steel, solid, flat metal, crush gasket.

6. The fastener of claim 3 wherein the clamp connector is capable of mitigating wear on the clamp segments.

7. The fastener of claim 1 wherein each clamp segment of the clamp connector and each fastener are assembled together on a support plate to facilitate disposition on a structural unit.

8. The fastener of claim 7 wherein each fastener is disposed on the structure without welding.

9. The fastener of claim 3 wherein each clamp segment is manufactured in an oversized condition.

10. The fastener of claim 1 further comprising an incorporated wedge such that the wedge is capable of allowing the force reacting or force producing elements to be adjustable.

11. The fastener of claim 10 wherein the elements are self-adjusting when remote operated.

12. The fastener of claim 1 further comprising at least one interlock disposed about two ends.

13. The fastener of claim 1 further comprising a spring tension disposed about two ends.

14. A method of using a remote operable fastener, wherein the fastener is capable of being incorporated into a remote operable clamp connector having at least two clamp segments, including a first claim segment and a second clamp segment each clamp segment having at least two ends, and each clamp connector having at least one gap formed between one end of the first clamp segment and one end of the second clamp segment, the fastener comprising a plurality of force reacting or force producing elements capable of maintaining the gap, such that the failure of any one force reacting or force producing element does not increase the gap, the method comprising:

activating the fastener to drive the clamp segments to a closed and locked state.

15. The method of claim 14 further comprising activating each fastener to unlock and dispose to an open state.

16. The method of claim 14 further comprising mounting the clamp connector on a preexisting structural unit.

17. The method of claim 16 wherein the preexisting structural unit is part of a coking unit.

18. The method of claim 14 further comprising manually interlocking each clamp segments to prevent inadvertent activation of the clamp segments.

19. The method of claim 14 further comprising remotely cleaning each clamp segment using a cleaning substance.

20. A method for using a remote operable fastener, wherein the fastener is capable of being incorporated into a remote operable clamp connector having at least two clamp segments, including a first clamp segment and a second clamp segment, each clamp segment having at least two ends, and each clamp connector having at least one gap formed between one end of the first clamp segment and one end of the second clamp segment, the fastener comprising a plurality of force reacting or force producing elements capable of maintaining the gap, such that the failure of any one force reacting or force producing element does not increase the gap, the method comprising:

coupling flange members with the clamp connector by actuating each fastener to diminish the gap.

\* \* \* \* \*